(12) United States Patent
Guo

(10) Patent No.: US 10,945,203 B2
(45) Date of Patent: Mar. 9, 2021

(54) WAKE-UP METHOD, STATION, AND ACCESS POINT

(71) Applicant: HUAWEI TECHNOLOGIES CO., LTD., Guangdong (CN)

(72) Inventor: Yuchen Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/405,663

(22) Filed: May 7, 2019

(65) Prior Publication Data

US 2019/0268842 A1 Aug. 29, 2019

Related U.S. Application Data

(63) Continuation of application No. PCT/CN2017/090484, filed on Jun. 28, 2017.

(30) Foreign Application Priority Data

Nov. 9, 2016 (CN) .......................... 201610986024.8

(51) Int. Cl.
*H04W 52/02* (2009.01)
*H04W 72/04* (2009.01)
*H04W 84/12* (2009.01)

(52) U.S. Cl.
CPC ....... *H04W 52/0206* (2013.01); *H04W 52/02* (2013.01); *H04W 52/0235* (2013.01); *H04W 72/04* (2013.01); *H04W 84/12* (2013.01); *Y02D 30/70* (2020.08)

(58) Field of Classification Search
CPC ............. H04W 52/0206; H04W 52/02; H04W 52/0235; H04W 72/04; H04W 84/12; H04W 76/28; Y02D 70/126; Y02D 70/12; Y02D 70/124; Y02D 70/10; Y02D 70/14; Y02D 70/122; Y02D 70/00
See application file for complete search history.

(56) References Cited

U.S. PATENT DOCUMENTS

| | | | |
|---|---|---|---|
| 2012/0250731 A1 | 10/2012 | Taghavi et al. | |
| 2013/0094415 A1* | 4/2013 | Ling | G06F 1/3234 370/311 |
| 2014/0112226 A1 | 4/2014 | Jafarian et al. | |

(Continued)

FOREIGN PATENT DOCUMENTS

| | | |
|---|---|---|
| CN | 104756560 A | 7/2015 |
| CN | 104796971 A | 7/2015 |

(Continued)

*Primary Examiner* — Peter P Chau
(74) *Attorney, Agent, or Firm* — Rimon PC

(57) ABSTRACT

This application provides a wake-up method, a station, and an access point. The method is performed in a communications system. The communications system can include an access point (AP) and at least one station (STA). The AP includes a wake-up transceiver (WUR) and a main transceiver. The method can include determining, by a first STA, that the AP is in a sleep state, where when the AP is in the sleep state, the main transceiver of the AP is in an off state. The method can also include transmitting, by the first STA, a wake-up frame to the WUR of the AP, where the wake-up frame triggers the WUR of the AP to wake up the main transceiver of the AP. Therefore, an uplink data transmission latency can be reduced.

17 Claims, 10 Drawing Sheets

(56) References Cited

U.S. PATENT DOCUMENTS

| | | | |
|---|---|---|---|
| 2015/0256991 A1 | 9/2015 | Gantman et al. | |
| 2016/0234783 A1 | 8/2016 | Xing | |
| 2016/0374019 A1* | 12/2016 | Park | H04W 8/24 |
| 2017/0332327 A1* | 11/2017 | Fang | H04L 5/0007 |
| 2018/0049131 A1* | 2/2018 | Huang | H04W 52/0248 |
| 2018/0069683 A1* | 3/2018 | Huang | H04L 5/0092 |
| 2018/0115952 A1* | 4/2018 | Shellhammer | H04L 43/0829 |
| 2018/0206193 A1* | 7/2018 | Adachi | H04W 52/0235 |
| 2018/0302854 A1 | 10/2018 | Ramamurthy et al. | |
| 2019/0159127 A1* | 5/2019 | Son | H04W 52/0216 |
| 2019/0191376 A1* | 6/2019 | Kim | H04W 84/12 |
| 2019/0246356 A1* | 8/2019 | Kim | H04W 52/0235 |
| 2019/0357143 A1* | 11/2019 | Wang | H04W 52/0229 |
| 2019/0364505 A1* | 11/2019 | Wang | H04W 52/0235 |

FOREIGN PATENT DOCUMENTS

| | | |
|---|---|---|
| CN | 106063338 A | 10/2016 |
| WO | 2015/054892 A1 | 4/2015 |

\* cited by examiner

WAKE-UP METHOD, STATION, AND ACCESS POINT

CROSS-REFERENCE TO RELATED APPLICATIONS

This application is a continuation of International Application No. PCT/CN2017/090484, filed on Jun. 28, 2017, which claims priority to Chinese Patent Application No. 201610986024.8, filed on Nov. 9, 2016. The disclosures of the aforementioned applications are incorporated herein by reference in their entireties.

TECHNICAL FIELD

Embodiments of this application relate to the wireless local area network field, and more specifically, to a wake-up method, a station, and an access point.

BACKGROUND

With development of mobile communications technologies, mobile applications are increasingly diversified, and device functions are increasingly rich. Reducing energy consumption of a device becomes one of important technical objectives in a wireless network. Smart power saving of a node is a main means to achieve low energy consumption. How to wake-up a node sleeping in a power saving mode, for example, how to wake up the node when there is an emergency service requirement or a real-time service requirement, is a difficult problem to be urgently resolved. In the wireless local area network (WLAN) field, related solutions in conventional 802.11 protocols (for example, 802.11b, 802.11a, 802.11g, 802.11n, and 802.11ac) are mainly concentrated on optimizing sleep policies of devices.

In a WLAN, a large part of energy of a device is wasted in idle listening when no signal is received. Therefore, in addition to optimizing a sleep policy, reducing energy consumption of the device in idle listening is another technical means to reduce energy consumption. A current solution is using a low-power wake-up transceiver (LP-WUR) for implementation, where the LP-WUR may be referred to as a wake-up transceiver (WUR) for short. A core idea of the solution is that a station (STA) additionally includes a WUR, apart from a conventional main transceiver (Main Radio), for example, an 802.11 main radio or a Wireless Fidelity (Wi-Fi) main radio.

Currently, in addition to a relatively high energy consumption requirement of the STA, energy saving of an access point (AP) also becomes an important research field. In a related prior art, when an AP expects to enter an energy save mode, the AP may act as a target wake time (TWT) requesting node to transmit TWT request information to another TWT responding node, requesting to set a wake-up time; or the AP may directly broadcast a TWT information element in a beacon frame, and sleep within a time before a wake-up time specified by the TWT information element.

However, after the AP enters a sleep state, even if a STA needs to transmit an uplink data packet, the STA can transmit the uplink data packet only after the AP wakes up. Therefore, a relatively high transmission latency is caused.

SUMMARY

This application provides a wake-up method, a station, and an access point to reduce an information transmission latency.

A first aspect provides a wake-up method, where the method is applied to a communications system, the communications system includes an access point AP and at least one station STA, the AP includes a wake-up transceiver WUR and a main transceiver, and the method includes: determining, by a first STA, that the AP is currently in a sleep state, where when the AP is in the sleep state, the main transceiver of the AP is in an off state; and transmitting, by the first STA, a wake-up frame to the WUR of the AP, where the wake-up frame is used to trigger the WUR of the AP to wake up the main transceiver of the AP.

In the wake-up method according to this application, when the station determines that the access point is in the sleep state, the station can wake up the access point by transmitting the wake-up frame, and then transmit uplink data, thereby reducing an uplink data transmission latency.

With reference to the first aspect, in a possible embodiment of the first aspect, the method further includes: transmitting, by the first STA, a first capability information frame to the main transceiver of the AP, where the first capability information frame carries first indication information, and the first indication information is used to indicate whether the first STA has a capability of transmitting a wake-up frame.

With reference to the first aspect or the foregoing possible embodiment of the first aspect, in another possible embodiment of the first aspect, the method further includes: receiving, by the first STA, a second capability information frame transmitted by the AP by using the main transceiver of the AP, where the second capability information frame carries second indication information and/or third indication information, the second indication information is used to indicate whether the AP includes the WUR, and the third indication information is used to indicate whether the AP can be woken up by the first STA.

Therefore, by exchanging the capability information between the access point and the station, the access point knows whether the station has a wake-up capability, and the station knows whether the access point can be woken up, so that when the station needs to transmit the uplink data in a time period in which the access point is in the sleep state, the station wakes up the access point by transmitting the wake-up frame and further transmits the uplink data, thereby reducing the uplink data transmission latency.

With reference to the first aspect or the foregoing possible embodiment of the first aspect, in another possible embodiment of the first aspect, before the transmitting, by the first STA, a wake-up frame to the WUR of the AP, the method further includes: determining, by the first STA based on the second indication information, that the AP includes the WUR; or determining, by the first STA based on the third indication information, that the AP can be woken up by the first STA.

With reference to the first aspect or the foregoing possible embodiment of the first aspect, in another possible embodiment of the first aspect, the second capability information frame further carries a wake-up identifier, and the wake-up identifier is used to identify the WUR of the AP; and the transmitting, by the first STA, a wake-up frame to the WUR of the AP includes: transmitting, by the first STA, the wake-up frame to the WUR of the AP based on the wake-up identifier.

With reference to the first aspect or the foregoing possible embodiment of the first aspect, in another possible embodiment of the first aspect, the wake-up frame carries the wake-up identifier.

With reference to the first aspect or the foregoing possible embodiment of the first aspect, in another possible embodiment of the first aspect, the method further includes: receiving, by the first STA, a sleep notification frame transmitted by the AP by using the main transceiver of the AP, where the sleep notification frame carries sleep state indication information, and the sleep state indication information is used to indicate information related to the sleep state; and the determining, by a first STA, that the AP is currently in a sleep state includes: determining, by the first STA based on the sleep state indication information, that the AP is currently in the sleep state.

With reference to the first aspect or the foregoing possible embodiment of the first aspect, in another possible embodiment of the first aspect, the sleep state indication information includes at least one of the following indication information: fourth indication information, fifth indication information, and sixth indication information, where the fourth indication information is used to indicate that the AP enters the sleep state after the AP has transmitted the sleep notification frame, the fifth indication information is used to indicate a time at which the AP starts to enter the sleep state, and the sixth indication information is used to indicate a duration in which the AP is in the sleep state.

With reference to the first aspect or the foregoing possible embodiment of the first aspect, in another possible embodiment of the first aspect, the sleep state indication information includes seventh indication information, and the seventh indication information is used to indicate a quantity of sleep notification frames that the first STA further needs to receive in a receive period of the sleep notification frame after the first STA has received the sleep notification frame.

In other words, the sleep notification frame may be transmitted periodically. The AP may transmit a plurality of sleep notification frames in a transmit period. The STA receives the sleep notification frame based on quantity information carried in the sleep notification frame, and determines, based on the received sleep notification frame, the time period in which the AP is in the sleep state.

Because the AP transmits the plurality of sleep notification frames, it can be ensured that all STAs can receive the sleep notification frames, and system robustness is improved.

With reference to the first aspect or the foregoing possible embodiment of the first aspect, in another possible embodiment of the first aspect, the sleep state indication information includes eighth indication information, the eighth indication information is used to indicate a work mode of the WUR of the AP in the time period in which the AP is in the sleep state, and the work mode includes an always-on work mode and a periodically-on work mode.

With reference to the first aspect or the foregoing possible embodiment of the first aspect, in another possible embodiment of the first aspect, the eighth indication information indicates that the work mode of the WUR of the AP is the periodically-on work mode in the time period in which the AP is in the sleep state, the sleep state indication information further includes ninth indication information, and the ninth indication information is used to indicate a time period in which the WUR of the AP is in an on state; and the transmitting, by the first STA, a wake-up frame to the WUR of the AP includes: transmitting, by the first STA, the wake-up frame to the WUR of the AP in the time period indicated by the ninth indication information.

Therefore, the STA can transmit the wake-up frame to the main transceiver in the time period in which the WUR of the AP is in the on state, and it is ensured that the main transceiver of the AP can successfully receive the wake-up frame.

With reference to the first aspect or the foregoing possible embodiment of the first aspect, in another possible embodiment of the first aspect, the sleep state indication information further includes contention window size information, and the contention window size information is used to indicate a size of a contention window; and the transmitting, by the first STA, a wake-up frame to the WUR of the AP includes: determining, by the first STA, a transmit time of the wake-up frame based on the size of the contention window in the time period in which the WUR of the AP is in the on state; and transmitting, by the first STA, the wake-up frame to the WUR of the AP at the transmit time of the wake-up frame.

Therefore, each STA can calculate a random backoff value based on the size of the contention window, to reduce collision when a plurality of STAs transmit wake-up frames.

With reference to the first aspect or the foregoing possible embodiment of the first aspect, in another possible embodiment of the first aspect, the wake-up frame carries a buffer status report BSR, and the BSR is used to indicate a type of data that the first STA needs to transmit and a size of the data.

With reference to the first aspect or the foregoing possible embodiment of the first aspect, in another possible embodiment of the first aspect, the method further includes: receiving, by the first STA, a response frame transmitted by the AP by using the main transceiver of the AP, where the response frame carries resource allocation information and/or acknowledgement information, the resource allocation information is determined by the AP based on the BSR, and the acknowledgement information is used to indicate that the AP successfully receives the wake-up frame; and transmitting, by the first STA, information to the main transceiver of the AP based on the response frame.

Optionally, the resource allocation information is used to indicate information such as a duration that may be used when the STA transmits a data frame, a channel bandwidth, a modulation and coding scheme that needs to be used, a quantity of spatial flows that may be transmitted, and transmit power.

With reference to the first aspect or the foregoing possible embodiment of the first aspect, in another possible embodiment of the first aspect, the method further includes: transmitting, by the first STA, a first work mode information frame to the main transceiver of the AP, where the first work mode information frame carries first work mode indication information, and the first work mode indication information is used to indicate a work mode of the first STA in the time period in which the AP is in the sleep state.

With reference to the first aspect or the foregoing possible embodiment of the first aspect, in another possible embodiment of the first aspect, the method further includes: transmitting, by the first STA, a second work mode information frame to the main transceiver of the AP, where the second work mode information frame carries second work mode indication information, and the second work mode indication information is used to indicate whether the AP can transmit a data frame to the first STA in the time period in which the AP is in the sleep state.

Therefore, the STA reports the work mode of the STA to the AP in the time period in which the AP is in the sleep state, so that the AP transmits downlink data to the STA by using an appropriate procedure.

With reference to the first aspect or the foregoing possible embodiment of the first aspect, in another possible embodiment of the first aspect, the method further includes: receiving, by the first STA, a wake-up declaration frame transmitted by the AP by using the main transceiver of the AP, where the wake-up declaration frame carries wake-up declaration information, and the wake-up declaration information is used to indicate that the main transceiver of the AP is in a wake-up state.

It should be noted that, the wake-up declaration frame transmitted by the AP is transmitted by broadcast to a plurality of STAs. Therefore, the STA can directly transmit data to the AP after determining, based on the wake-up declaration frame, that the AP is in the wake-up state, and does not need to first transmit the wake-up frame to wake up the AP before transmitting the data. This can reduce signaling overheads and reduce a data transmission latency.

With reference to the first aspect or the foregoing possible embodiment of the first aspect, in another possible embodiment of the first aspect, the method further includes: determining, by the first STA, an uplink transmission requirement of at least one second STA; and the transmitting, by the first STA, a wake-up frame to the WUR of the AP includes: transmitting, by the first STA, the wake-up frame carrying data transmission requirement information to the WUR of the AP, where the data transmission requirement information is used to indicate the uplink transmission requirement of the at least one second STA.

With reference to the first aspect or the foregoing possible embodiment of the first aspect, in another possible embodiment of the first aspect, the method further includes: determining, by the first STA, an uplink transmission requirement of at least one second STA; and after the transmitting, by the first STA, a wake-up frame to the WUR of the AP, the method further includes: transmitting, by the first STA, an information frame to the main transceiver of the AP, where the information frame carries data transmission requirement information, and the data transmission requirement information is used to indicate the uplink transmission requirement of the at least one second STA.

Therefore, one STA in a plurality of STAs may act as a representative to help other STAs wake up the AP, and by waking up the AP only once, notify the AP of uplink transmission requirements of all STAs. This can reduce a quantity of transmitted wake-up frames.

With reference to the first aspect or the foregoing possible embodiment of the first aspect, in another possible embodiment of the first aspect, the method further includes: transmitting, by the first STA, a transmission opportunity TXOP grant frame to a third STA, where the TXOP grant frame carries TXOP grant information, and the TXOP grant information is used to instruct the third STA to transmit data to the AP in a time period corresponding to a transmission opportunity of the first STA.

In other words, when the transmission opportunity of the first STA is not used up, the first STA grants the transmission opportunity to the third STA, so that the third STA directly transmits uplink data by using the transmission opportunity of the first STA, without performing channel contention. Therefore, resource utilization can be improved, and a transmission latency can be reduced.

A second aspect provides a wake-up method, where the method is applied to a communications system, the communications system includes an access point AP and at least one station STA, the AP includes a wake-up transceiver WUR and a main transceiver, and the method includes: receiving, by the AP by using the WUR, a wake-up frame transmitted by a first STA, where the wake-up frame is used to trigger the WUR to wake-up the main transceiver; and waking up, by the AP by using the WUR, the main transceiver based on the wake-up frame.

In the wake-up method according to this application, the access point can receive the wake-up frame transmitted by the station, and wake up, by using the WUR, the main transceiver based on the wake-up frame. Therefore, when the station needs to transmit uplink data, an uplink data transmission latency can be reduced.

With reference to the second aspect, in a possible embodiment of the second aspect, the method further includes: receiving, by the AP by using the main transceiver, a first capability information frame transmitted by the first STA, where the first capability information frame carries first indication information, and the first indication information is used to indicate whether the first STA has a capability of transmitting a wake-up frame.

With reference to the second aspect or the foregoing possible embodiment of the second aspect, in another possible embodiment of the second aspect, the method further includes: transmitting, by the AP, a second capability information frame to the first STA by using the main transceiver, where the second capability information frame carries second indication information and/or third indication information, the second indication information is used to indicate whether the AP includes the WUR, and the third indication information is used to indicate whether the AP can be woken up by the first STA.

With reference to the second aspect or the foregoing possible embodiment of the second aspect, in another possible embodiment of the second aspect, the second capability information frame further carries a wake-up identifier, and the wake-up identifier is used to identify the WUR of the AP.

With reference to the second aspect or the foregoing possible embodiment of the second aspect, in another possible embodiment of the second aspect, the wake-up frame carries the wake-up identifier.

With reference to the second aspect or the foregoing possible embodiment of the second aspect, in another possible embodiment of the second aspect, the method further includes: transmitting, by the AP, a sleep notification frame to the first STA by using the main transceiver, where the sleep notification frame carries sleep state indication information, and the sleep state indication information is used to indicate information related to a sleep state.

With reference to the second aspect or the foregoing possible embodiment of the second aspect, in another possible embodiment of the second aspect, the sleep state indication information includes at least one of the following indication information: fourth indication information, fifth indication information, and sixth indication information, where the fourth indication information is used to indicate that the AP enters the sleep state after the AP has transmitted the sleep notification frame, the fifth indication information is used to indicate a time at which the AP starts to enter the sleep state, and the sixth indication information is used to indicate a duration in which the AP is in the sleep state.

With reference to the second aspect or the foregoing possible embodiment of the second aspect, in another possible embodiment of the second aspect, the sleep state indication information includes seventh indication information, and the seventh indication information is used to indicate a quantity of sleep notification frames that the first STA further needs to receive in a receive period of the sleep notification frame after the first STA has received the sleep notification frame.

With reference to the second aspect or the foregoing possible embodiment of the second aspect, in another possible embodiment of the second aspect, the sleep state indication information includes eighth indication information, the eighth indication information is used to indicate a work mode of the WUR in a time period in which the AP is in the sleep state, and the work mode includes an always-on work mode and a periodically-on work mode.

With reference to the second aspect or the foregoing possible embodiment of the second aspect, in another possible embodiment of the second aspect, the eighth indication information indicates that the work mode of the WUR is the periodically-on work mode in the time period in which the AP is in the sleep state, the sleep state indication information further includes ninth indication information, and the ninth indication information is used to indicate a time period in which the WUR is in an on state.

With reference to the second aspect or the foregoing possible embodiment of the second aspect, in another possible embodiment of the second aspect, the sleep state indication information further includes contention window size information, and the contention window size information is used to indicate a size of a contention window, so that the first STA determines a transmit time of the wake-up frame based on the size of the contention window in the time period in which the WUR is in the on state.

With reference to the second aspect or the foregoing possible embodiment of the second aspect, in another possible embodiment of the second aspect, the wake-up frame carries a buffer status report BSR, and the BSR is used to indicate a type of data that the first STA needs to transmit and a size of the data.

With reference to the second aspect or the foregoing possible embodiment of the second aspect, in another possible embodiment of the second aspect, the method further includes: transmitting, by the AP, a response frame to the first STA by using the main transceiver, where the response frame carries resource allocation information and/or acknowledgement information, the resource allocation information is determined by the AP based on the BSR, and the acknowledgement information is used to indicate that the AP successfully receives the wake-up frame.

With reference to the second aspect or the foregoing possible embodiment of the second aspect, in another possible embodiment of the second aspect, the method further includes: receiving, by the AP by using the main transceiver, a first work mode information frame transmitted by the first STA, where the first work mode information frame carries first work mode indication information, and the first work mode indication information is used to indicate a work mode of the first STA in the time period in which the AP is in the sleep state; and transmitting, by the AP by using the main transceiver, a data frame to the first STA based on the first work mode indication information.

With reference to the second aspect or the foregoing possible embodiment of the second aspect, in another possible embodiment of the second aspect, the method further includes: receiving, by the AP by using the main transceiver, a second work mode information frame transmitted by the first STA, where the second work mode information frame carries second work mode indication information, and the second work mode indication information is used to indicate whether the AP can transmit a data frame to the first STA in the time period in which the AP is in the sleep state.

With reference to the second aspect or the foregoing possible embodiment of the second aspect, in another possible embodiment of the second aspect, the method further includes: transmitting, by the AP, a wake-up declaration frame to the first STA by using the main transceiver, where the wake-up declaration frame carries wake-up declaration information, and the wake-up declaration information is used to indicate that the main transceiver is in a wake-up state.

With reference to the second aspect or the foregoing possible embodiment of the second aspect, in another possible embodiment of the second aspect, the wake-up frame carries data transmission requirement information, and the data transmission requirement information is used to indicate an uplink transmission requirement of at least one second STA; and the method further includes: transmitting, by the AP, a trigger frame to the first STA and the at least one second STA by using the main transceiver, where the trigger frame is used to trigger the first STA and the at least one second STA to transmit data.

With reference to the second aspect or the foregoing possible embodiment of the second aspect, in another possible embodiment of the second aspect, after the receiving, by the AP by using the WUR, a wake-up frame transmitted by a first STA, the method further includes: receiving, by the AP by using the main transceiver, an information frame transmitted by the first STA, where the information frame carries data transmission requirement information, and the data transmission requirement information is used to indicate an uplink transmission requirement of at least one second STA; and receiving, by the AP by using the main transceiver in a preset time period, uplink data transmitted by the at least one second STA.

With reference to the second aspect or the foregoing possible embodiment of the second aspect, in another possible embodiment of the second aspect, the method further includes: receiving, by the AP, data transmitted by a third STA to the AP in a time period corresponding to a transmission opportunity of the first STA.

A third aspect provides a wake-up method, where the method is applied to a communications system, the communications system includes an access point AP and at least one station STA, the AP includes a wake-up transceiver WUR and a main transceiver, and the method includes: when a first STA determines that a second STA transmits a wake-up frame to the WUR of the AP, starting, by the first STA, to contend for a channel; and when the first STA successfully contends for the channel, transmitting, by the first STA, a data frame to the AP by using the channel obtained through contention.

In the wake-up method according to this application, when a station determines that another station transmits a wake-up frame to the access point, the station may not transmit a wake-up frame to the access point any longer, but directly contends for a channel, and transmits uplink data on the channel obtained through contention. Therefore, signaling overheads can be reduced, and an uplink data transmission latency can be reduced.

With reference to the third aspect, in a possible embodiment of the third aspect, the starting, by the first STA, to contend for a channel includes: when the first STA determines that the AP transmits a response frame to the second STA, starting, by the first STA, to contend for the channel, where the response frame carries acknowledgement information and/or trigger information, the acknowledgement information is used to acknowledge the wake-up frame, and the trigger information is used to trigger the second STA to transmit a data frame.

With reference to the third aspect or the foregoing possible embodiment of the third aspect, in another possible embodiment of the third aspect, the method further includes: starting, by the first STA, a timer; and the transmitting, by the first STA, a data frame to the AP by using the channel obtained through contention includes: when the first STA determines that the timer has not expired when the channel contention succeeds, transmitting, by the first STA, the data frame to the AP by using the channel obtained through contention.

With reference to the third aspect or the foregoing possible embodiment of the third aspect, in another possible embodiment of the third aspect, the response frame carries duration information, and the method further includes: determining, by the first STA, a timing duration of the timer based on the duration information.

A fourth aspect provides a wake-up method, where the method is applied to a communications system, the communications system includes an access point AP and at least one station STA, the AP includes a wake-up transceiver WUR and a main transceiver, and the method includes: receiving, by the access point AP by using the WUR, a wake-up frame transmitted by a second STA, where the wake-up frame is used to trigger the WUR to wake up the main transceiver; waking up, by the AP by using the WUR, the main transceiver based on the wake-up frame; and receiving, by the AP by using the main transceiver, a data frame transmitted by the second STA.

In the wake-up method according to this application, when the access point is woken up by a wake-up frame transmitted by a station, the access point may receive uplink data transmitted by another station. Therefore, the another station does not need to transmit a wake-up frame to the access point any longer, but directly contends for a channel, and transmits the uplink data on the channel obtained through contention. Therefore, signaling overheads can be reduced, and an uplink data transmission latency can be reduced.

With reference to the fourth aspect, in a possible embodiment of the fourth aspect, the method further includes: transmitting, by the AP, a response frame to the second STA by using the main transceiver, where the response frame carries acknowledgement information and/or trigger information, the acknowledgement information is used to acknowledge the wake-up frame, and the trigger information is used to trigger the second STA to transmit the data frame.

With reference to the fourth aspect or the foregoing possible embodiment of the fourth aspect, in another possible embodiment of the fourth aspect, the response frame further carries duration information, so that a first STA determines a timing duration of a timer based on the duration information.

A fifth aspect provides a station, where the STA is applied to a communications system, the communications system includes an access point AP and at least one STA, the at least one STA includes the STA, the AP includes a wake-up transceiver and a main transceiver, and the STA includes a processing module, a wake-up transceiver module, and a main transceiver module, where the processing module is configured to determine that the AP is currently is a sleep state, where when the AP is in the sleep state, the main transceiver of the AP is in an off state; and the wake-up transceiver module is configured to transmit a wake-up frame to the WUR of the AP, where the wake-up frame is used to trigger the WUR of the AP to wake up the main transceiver of the AP.

With reference to the fifth aspect, in a possible embodiment of the fifth aspect, the main transceiver module is configured to transmit a first capability information frame to the main transceiver of the AP, where the first capability information frame carries first indication information, and the first indication information is used to indicate whether the STA has a capability of transmitting a wake-up frame.

With reference to the fifth aspect or the foregoing possible embodiment of the fifth aspect, in another possible embodiment of the fifth aspect, the main transceiver module is configured to receive a second capability information frame transmitted by the AP by using the main transceiver of the AP, where the second capability information frame carries second indication information and/or third indication information, the second indication information is used to indicate whether the AP includes the WUR, and the third indication information is used to indicate whether the AP can be woken up by the STA.

With reference to the fifth aspect or the foregoing possible embodiment of the fifth aspect, in another possible embodiment of the fifth aspect, before the wake-up transceiver module transmits the wake-up frame to the WUR of the AP, the processing module is further configured to: determine, based on the second indication information, that the AP includes the WUR; or determine, based on the third indication information, that the AP can be woken up by the STA.

With reference to the fifth aspect or the foregoing possible embodiment of the fifth aspect, in another possible embodiment of the fifth aspect, the second capability information frame further carries a wake-up identifier, and the wake-up identifier is used to identify the WUR of the AP; and the wake-up transceiver module is specifically configured to transmit the wake-up frame to the WUR of the AP based on the wake-up identifier.

With reference to the fifth aspect or the foregoing possible embodiment of the fifth aspect, in another possible embodiment of the fifth aspect, the wake-up frame carries the wake-up identifier.

With reference to the fifth aspect or the foregoing possible embodiment of the fifth aspect, in another possible embodiment of the fifth aspect, the main transceiver module is further configured to receive a sleep notification frame transmitted by the AP by using the main transceiver of the AP, where the sleep notification frame carries sleep state indication information, and the sleep state indication information is used to indicate information related to the sleep state; and the processing module is specifically configured to determine, based on the sleep state indication information, that the AP is currently in the sleep state.

With reference to the fifth aspect or the foregoing possible embodiment of the fifth aspect, in another possible embodiment of the fifth aspect, the sleep state indication information includes at least one of the following indication information: fourth indication information, fifth indication information, and sixth indication information, where the fourth indication information is used to indicate that the AP enters the sleep state after the AP has transmitted the sleep notification frame, the fifth indication information is used to indicate a time at which the AP starts to enter the sleep state, and the sixth indication information is used to indicate a duration in which the AP is in the sleep state.

With reference to the fifth aspect or the foregoing possible embodiment of the fifth aspect, in another possible embodiment of the fifth aspect, the sleep state indication information includes seventh indication information, and the seventh indication information is used to indicate a quantity of sleep notification frames that the STA further needs to receive in a receive period of the sleep notification frame after the STA has received the sleep notification frame.

With reference to the fifth aspect or the foregoing possible embodiment of the fifth aspect, in another possible embodiment of the fifth aspect, the sleep state indication information includes eighth indication information, the eighth indication information is used to indicate a work mode of the WUR of the AP in a time period in which the AP is in the sleep state, and the work mode includes an always-on work mode and a periodically-on work mode.

With reference to the fifth aspect or the foregoing possible embodiment of the fifth aspect, in another possible embodiment of the fifth aspect, the eighth indication information indicates that the work mode of the WUR of the AP is the periodically-on work mode in the time period in which the AP is in the sleep state, the sleep state indication information further includes ninth indication information, and the ninth indication information is used to indicate a time period in which the WUR of the AP is in an on state; and the wake-up transceiver module is specifically configured to transmit the wake-up frame to the WUR of the AP in the time period indicated by the ninth indication information.

With reference to the fifth aspect or the foregoing possible embodiment of the fifth aspect, in another possible embodiment of the fifth aspect, the sleep state indication information further includes contention window size information, and the contention window size information is used to indicate a size of a contention window; and the wake-up transceiver module is specifically configured to: determine a transmit time of the wake-up frame based on the size of the contention window in the time period in which the WUR of the AP is in the on state; and transmit the wake-up frame to the WUR of the AP at the transmit time of the wake-up frame.

With reference to the fifth aspect or the foregoing possible embodiment of the fifth aspect, in another possible embodiment of the fifth aspect, the wake-up frame carries a buffer status report BSR, and the BSR is used to indicate a type of data that the STA needs to transmit and a size of the data.

With reference to the fifth aspect or the foregoing possible embodiment of the fifth aspect, in another possible embodiment of the fifth aspect, the main transceiver module is further configured to: receive a response frame transmitted by the AP by using the main transceiver of the AP, where the response frame carries resource allocation information and/or acknowledgement information, the resource allocation information is determined by the AP based on the BSR, and the acknowledgement information is used to indicate that the AP successfully receives the wake-up frame; and transmit information to the main transceiver of the AP based on the response frame.

With reference to the fifth aspect or the foregoing possible embodiment of the fifth aspect, in another possible embodiment of the fifth aspect, the main transceiver module is further configured to transmit a first work mode information frame to the main transceiver of the AP, where the first work mode information frame carries first work mode indication information, and the first work mode indication information is used to indicate a work mode of the STA in the time period in which the AP is in the sleep state.

With reference to the fifth aspect or the foregoing possible embodiment of the fifth aspect, in another possible embodiment of the fifth aspect, the main transceiver module is further configured to transmit a second work mode information frame to the main transceiver of the AP, where the second work mode information frame carries second work mode indication information, and the second work mode indication information is used to indicate whether the AP can transmit a data frame to the STA in the time period in which the AP is in the sleep state.

With reference to the fifth aspect or the foregoing possible embodiment of the fifth aspect, in another possible embodiment of the fifth aspect, the main transceiver module is further configured to receive a wake-up declaration frame transmitted by the AP by using the main transceiver of the AP, where the wake-up declaration frame carries wake-up declaration information, and the wake-up declaration information is used to indicate that the main transceiver of the AP is in a wake-up state.

With reference to the fifth aspect or the foregoing possible embodiment of the fifth aspect, in another possible embodiment of the fifth aspect, the processing module is further configured to determine an uplink transmission requirement of at least one second STA; and the wake-up transceiver module is specifically configured to transmit the wake-up frame carrying data transmission requirement information to the WUR of the AP, where the data transmission requirement information is used to indicate the uplink transmission requirement of the at least one second STA.

With reference to the fifth aspect or the foregoing possible embodiment of the fifth aspect, in another possible embodiment of the fifth aspect, the processing module is further configured to determine an uplink transmission requirement of at least one second STA; and after the wake-up transceiver module transmits the wake-up frame to the WUR of the AP, the main transceiver module is further configured to transmit an information frame to the main transceiver of the AP, where the information frame carries data transmission requirement information, and the data transmission requirement information is used to indicate the uplink transmission requirement of the at least one second STA.

With reference to the fifth aspect or the foregoing possible embodiment of the fifth aspect, in another possible embodiment of the fifth aspect, the main transceiver module is further configured to transmit a transmission opportunity TXOP grant frame to a third STA, where the TXOP grant frame carries TXOP grant information, and the TXOP grant information is used to instruct the third STA to transmit data to the AP in a time period corresponding to a transmission opportunity of the STA.

A sixth aspect provides an access point AP, where the AP is applied to a communications system, the communications system includes the AP and at least one station STA, and the AP includes a wake-up transceiver module and a main transceiver module, where the wake-up transceiver module is configured to receive a wake-up frame transmitted by a first STA, where the wake-up frame is used to trigger the wake-up transceiver module to wake up the main transceiver module; and the wake-up transceiver module is further configured to wake up the main transceiver module based on the wake-up frame.

With reference to the sixth aspect or the foregoing possible embodiment of the sixth aspect, in another possible embodiment of the sixth aspect, the main transceiver module is configured to receive a first capability information frame transmitted by the first STA, where the first capability information frame carries first indication information, and the first indication information is used to indicate whether the first STA has a capability of transmitting a wake-up frame.

With reference to the sixth aspect or the foregoing possible embodiment of the sixth aspect, in another possible embodiment of the sixth aspect, the main transceiver module is further configured to transmit a second capability information frame to the first STA, where the second capability information frame carries second indication information and/or third indication information, the second indication information is used to indicate whether the AP includes the wake-up transceiver module, and the third indication information is used to indicate whether the AP can be woken up by the first STA.

With reference to the sixth aspect or the foregoing possible embodiment of the sixth aspect, in another possible embodiment of the sixth aspect, the second capability information frame further carries a wake-up identifier, and the wake-up identifier is used to identify the wake-up transceiver module of the AP.

With reference to the sixth aspect or the foregoing possible embodiment of the sixth aspect, in another possible embodiment of the sixth aspect, the wake-up frame carries the wake-up identifier.

With reference to the sixth aspect or the foregoing possible embodiment of the sixth aspect, in another possible embodiment of the sixth aspect, the main transceiver module is further configured to transmit a sleep notification frame to the first STA, where the sleep notification frame carries sleep state indication information, and the sleep state indication information is used to indicate information related to a sleep state.

With reference to the sixth aspect or the foregoing possible embodiment of the sixth aspect, in another possible embodiment of the sixth aspect, the sleep state indication information includes at least one of the following indication information: fourth indication information, fifth indication information, and sixth indication information, where the fourth indication information is used to indicate that the AP enters the sleep state after the AP has transmitted the sleep notification frame, the fifth indication information is used to indicate a time at which the AP starts to enter the sleep state, and the sixth indication information is used to indicate a duration in which the AP is in the sleep state.

With reference to the sixth aspect or the foregoing possible embodiment of the sixth aspect, in another possible embodiment of the sixth aspect, the sleep state indication information includes seventh indication information, and the seventh indication information is used to indicate a quantity of sleep notification frames that the first STA further needs to receive in a receive period of the sleep notification frame after the first STA has received the sleep notification frame.

With reference to the sixth aspect or the foregoing possible embodiment of the sixth aspect, in another possible embodiment of the sixth aspect, the sleep state indication information includes eighth indication information, the eighth indication information is used to indicate a work mode of the wake-up transceiver module in a time period in which the AP is in the sleep state, and the work mode includes an always-on work mode and a periodically-on work mode.

With reference to the sixth aspect or the foregoing possible embodiment of the sixth aspect, in another possible embodiment of the sixth aspect, the eighth indication information indicates that the work mode of the wake-up transceiver module is the periodically-on work mode in the time period in which the AP is in the sleep state, the sleep state indication information further includes ninth indication information, and the ninth indication information is used to indicate a time period in which the wake-up transceiver module is in an on state.

With reference to the sixth aspect or the foregoing possible embodiment of the sixth aspect, in another possible embodiment of the sixth aspect, the sleep state indication information further includes contention window size information, and the contention window size information is used to indicate a size of a contention window, so that the first STA determines a transmit time of the wake-up frame based on the size of the contention window in the time period in which the wake-up transceiver module is in the on state.

With reference to the sixth aspect or the foregoing possible embodiment of the sixth aspect, in another possible embodiment of the sixth aspect, the wake-up frame carries a buffer status report BSR, and the BSR is used to indicate a type of data that the first STA needs to transmit and a size of the data.

With reference to the sixth aspect or the foregoing possible embodiment of the sixth aspect, in another possible embodiment of the sixth aspect, the main transceiver module is further configured to transmit a response frame to the first STA, where the response frame carries resource allocation information and/or acknowledgement information, the resource allocation information is determined by the AP based on the BSR, and the acknowledgement information is used to indicate that the AP successfully receives the wake-up frame.

With reference to the sixth aspect or the foregoing possible embodiment of the sixth aspect, in another possible embodiment of the sixth aspect, the main transceiver module is further configured to: receive a first work mode information frame transmitted by the first STA, where the first work mode information frame carries first work mode indication information, and the first work mode indication information is used to indicate a work mode of the first STA in the time period in which the AP is in the sleep state; and transmit a data frame to the first STA based on the first work mode indication information.

With reference to the sixth aspect or the foregoing possible embodiment of the sixth aspect, in another possible embodiment of the sixth aspect, the main transceiver module is further configured to receive a second work mode information frame transmitted by the first STA, where the second work mode information frame carries second work mode indication information, and the second work mode indication information is used to indicate whether the AP can transmit a data frame to the first STA in the time period in which the AP is in the sleep state.

With reference to the sixth aspect or the foregoing possible embodiment of the sixth aspect, in another possible embodiment of the sixth aspect, the main transceiver module is further configured to transmit a wake-up declaration frame to the first STA, where the wake-up declaration frame carries wake-up declaration information, and the wake-up declaration information is used to indicate that the main transceiver module is in a wake-up state.

With reference to the sixth aspect or the foregoing possible embodiment of the sixth aspect, in another possible embodiment of the sixth aspect, the wake-up frame carries data transmission requirement information, and the data transmission requirement information is used to indicate an uplink transmission requirement of at least one second STA; and the main transceiver module is further configured to transmit a trigger frame to the first STA and the at least one second STA, where the trigger frame is used to trigger the first STA and the at least one second STA to transmit data.

With reference to the sixth aspect or the foregoing possible embodiment of the sixth aspect, in another possible embodiment of the sixth aspect, after the wake-up transceiver module receives the wake-up frame transmitted by the first STA, the main transceiver module is further configured to: receive an information frame transmitted by the first STA, where the information frame carries data transmission requirement information, and the data transmission requirement information is used to indicate an uplink transmission requirement of at least one second STA; and receive, in a preset time period, uplink data transmitted by the at least one second STA.

With reference to the sixth aspect or the foregoing possible embodiment of the sixth aspect, in another possible embodiment of the sixth aspect, the main transceiver module is further configured to receive data transmitted by a third STA to the AP in a time period corresponding to a transmission opportunity of the first STA.

A seventh aspect provides a station, where the station is applied to a communications system, the communications system includes an access point AP and at least one STA, the at least one station includes the station, the AP includes a wake-up transceiver WUR and a main transceiver, and the station includes a processing module and a main transceiver module, where the processing module is configured to start to contend for a channel when determining that a second STA transmits a wake-up frame to the WUR of the AP; and the main transceiver module is configured to: when the processing module successfully contends for the channel, transmit a data frame to the AP by using the channel obtained through contention.

With reference to the seventh aspect, in a possible embodiment of the seventh aspect, the processing module is specifically configured to start to contend for the channel when determining that the AP transmits a response frame to the second STA, where the response frame carries acknowledgement information and/or trigger information, the acknowledgement information is used to acknowledge the wake-up frame, and the trigger information is used to trigger the second STA to transmit a data frame.

With reference to the seventh aspect or the foregoing possible embodiment of the seventh aspect, in another possible embodiment of the seventh aspect, the processing module is further configured to start a timer; and the main transceiver module is specifically configured to: when the processing module determines that the timer has not expired when the channel contention succeeds, transmit the data frame to the AP by using the channel obtained through contention.

With reference to the seventh aspect or the foregoing possible embodiment of the seventh aspect, in another possible embodiment of the seventh aspect, the response frame carries duration information, and the processing module is specifically configured to determine a timing duration of the timer based on the duration information.

An eighth aspect provides an access point, where the access point is applied to a communications system, the communications system includes the access point AP and at least one station STA, and the AP includes a wake-up transceiver module and a main transceiver module, where the wake-up transceiver module is configured to receive a wake-up frame transmitted by a second STA, where the wake-up frame is used to trigger the wake-up transceiver module to wake up the main transceiver module; the wake-up transceiver module is further configured to wake up the main transceiver module based on the wake-up frame; and the main transceiver module is configured to receive a data frame transmitted by the second STA.

With reference to the eighth aspect, in a possible embodiment of the eighth aspect, the main transceiver module is further configured to transmit a response frame to the second STA, where the response frame carries acknowledgement information and/or trigger information, the acknowledgement information is used to acknowledge the wake-up frame, and the trigger information is used to trigger the second STA to transmit the data frame.

With reference to the eighth aspect or the foregoing possible embodiment of the eighth aspect, in another possible embodiment of the eighth aspect, the response frame further carries duration information, so that a first STA determines a timing duration of a timer based on the duration information.

A ninth aspect provides a station, where the station includes a processor, a memory, a wake-up transceiver, and a main transceiver, where the processor, the wake-up transceiver, and the main transceiver are connected by a bus, the memory is configured to store an instruction, and the processor is configured to invoke the instruction stored in the memory to control the wake-up transceiver to transmit information and the main transceiver to receive and transmit information, so that the station performs the method in the first aspect or any possible embodiment of the first aspect.

A tenth aspect provides an access point, where the access point includes a processor, a memory, a wake-up transceiver, and a main transceiver, where the processor, the wake-up transceiver, and the main transceiver are connected by a bus, the memory is configured to store an instruction, and the processor is configured to invoke the instruction stored in the memory to control the wake-up transceiver to transmit information and the main transceiver to receive and transmit information, so that the access point performs the method in the second aspect or any possible embodiment of the second aspect.

An eleventh aspect provides a station, where the station includes a processor, a memory, a wake-up transceiver, and a main transceiver, where the processor, the wake-up transceiver, and the main transceiver are connected by a bus, the memory is configured to store an instruction, and the processor is configured to invoke the instruction stored in the memory to control the wake-up transceiver to transmit information and the main transceiver to receive and transmit information, so that the station performs the method in the third aspect or any possible embodiment of the third aspect.

A twelfth aspect provides an access point, where the access point includes a processor, a memory, a wake-up transceiver, and a main transceiver, where the processor, the wake-up transceiver, and the main transceiver are connected by a bus, the memory is configured to store an instruction, and the processor is configured to invoke the instruction stored in the memory to control the wake-up transceiver to transmit information and the main transceiver to receive and transmit information, so that the access point performs the method in the fourth aspect or any possible embodiment of the fourth aspect.

A thirteenth aspect provides a computer-readable medium, configured to store a computer program, where the computer program includes an instruction used to perform the method in the first aspect or any possible embodiment of the first aspect.

A fourteenth aspect provides a computer-readable medium, configured to store a computer program, where the computer program includes an instruction used to perform the method in the second aspect or any possible embodiment of the second aspect.

A fifteenth aspect provides a computer-readable medium, configured to store a computer program, where the computer program includes an instruction used to perform the method in the third aspect or any possible embodiment of the third aspect.

A sixteenth aspect provides a computer-readable medium, configured to store a computer program, where the computer program includes an instruction used to perform the method in the fourth aspect or any possible embodiment of the fourth aspect.

DESCRIPTION OF EMBODIMENTS

The following clearly describes the technical solutions in the embodiments of this application with reference to the accompanying drawings in the embodiments of this application.

A wake-up method in the embodiments of this application may be applied to a WLAN, or may be applied to other various communications systems, such as a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD), a Universal Mobile Telecommunications System (UMTS), a Worldwide Interoperability for Microwave Access (WiMAX) communications system, and a future communications system.

Figure 1:
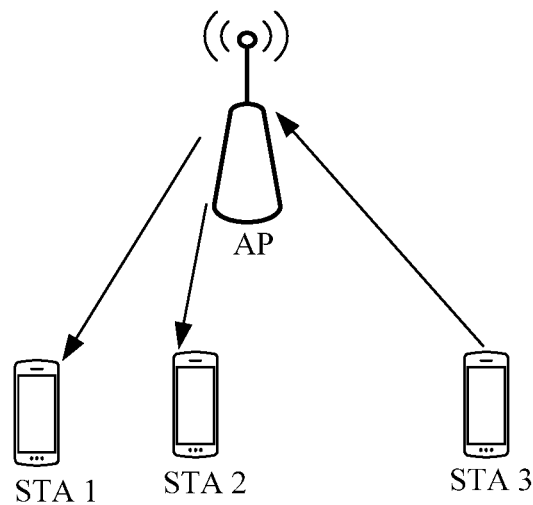
FIG. 1 is a schematic diagram of an application scenario according to an embodiment of this application.

FIG. 1 is a schematic diagram of an application scenario according to an embodiment of this application. A wireless local area network (WLAN) shown in FIG. 1 includes an access point (AP) and a station (STA). The AP is responsible for performing bidirectional communication with a plurality of STAs. For example, the AP shown in FIG. 1 transmits downlink data to the STA (for example, a STA 1 and a STA 2 in FIG. 1), or the AP receives uplink data from the STA (for example, a STA 3 in FIG. 1). It should be understood that, a quantity of APs and a quantity of STAs shown in FIG. 1 are merely examples, and the WLAN may include any quantity of APs and any quantity of STAs.

Figure 2:
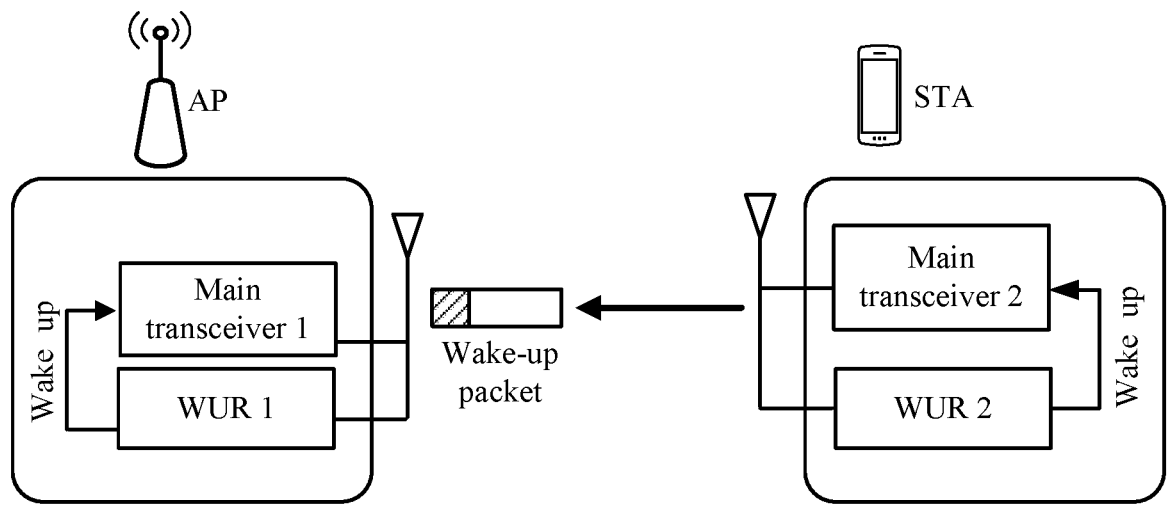
FIG. 2 is a schematic diagram of interaction between an access point and a station according to an embodiment of this application.

FIG. 2 is a schematic diagram of interaction between an access point and a station according to an embodiment of this application. The access point includes a main transceiver 1 and a WUR 1. The station includes a main transceiver 2 and a WUR 2. After the main transceiver 2 of the station falls in sleep, the low-power WUR 2 wakes up and starts to work. If the AP needs to communicate with the station, the AP first transmits a wake-up frame to the WUR 2 of the station by using a WUR channel. After correctly receiving the wake-up frame transmitted to the WUR 2, the WUR 2 wakes up the main transceiver 2 of the station. By using the main transceiver 1, the access point communicates with the main transceiver 2 that is woken up. After the main transceiver 2 completes communication with the access point, the main transceiver 2 enters a sleep state; and the WUR 2 listens a channel to determine whether there is a wake-up frame transmitted to the WUR 2, to wake up the main transceiver 2 when receiving the wake-up frame.

Likewise, after the main transceiver 1 of the access point falls in sleep, the low-power WUR 1 wakes up and starts to work. If the station needs to communicate with the access point, the station first needs to transmit a wake-up frame to the WUR 1 of the access point by using a WUR channel. After correctly receiving the wake-up frame transmitted to the WUR 1, the WUR 1 wakes up the main transceiver 1 of the access point. By using the main transceiver 2, the station communicates with the main transceiver 1 that is woken up. After the main transceiver 1 completes communication with the station, the main transceiver 1 enters a sleep state; and the WUR 1 listens a channel to determine whether there is a wake-up frame transmitted to the WUR 1, to wake up the main transceiver 1 when receiving the wake-up frame.

In the foregoing technology, a low-power WUR is used to replace a main transceiver to listen to a channel when a device (e.g., the station or the access point) is idle. This can effectively reduce energy waste of the device in idle listening. To achieve low power consumption, the WUR generally has low complexity in terms of a circuit structure design, a frame (for example, a wake-up frame) structure design, and the like. Energy consumption of the WUR in a listening state is about 0.1-1% of power consumption of the main transceiver 2, that is, less than 100 μW.

It should be understood that, a main transceiver of a device can be woken up only by a corresponding WUR of the device. Generally, the main transceiver may also be referred to as a main transceiver module, a main radio frequency module, or a main radio frequency unit. Unless otherwise specified in this specification, both the main transceiver and the WUR are a main transceiver and a WUR of a same device.

It should be understood that, a purpose of the WUR is to enable the main transceiver to be in an on (ON) state, that is, in a wake-up state. Therefore, "waking up the main transceiver" can include, for example, the following cases: if the main transceiver is originally in an off (OFF) state, that is, in a sleep state, "waking up the main transceiver" means changing the main transceiver to the on state; or if the main transceiver is originally in the on state, "waking up the main transceiver" means keeping the main transceiver in the on state.

It should also be understood that, "the WUR is off" may also be described as "the WUR enters the sleep state or a hibernation state or a power save state"; and "the WUR is on" may also be described as "the WUR enters the wake-up state or the on state or a work state".

As functions of wireless devices are increasingly diversified, and especially mobile APs emerge and Wi-Fi sharing applications in which STAs are used as hotspots gradually increase, in such application scenarios, an AP cannot obtain an uninterruptible alternating current supply, and can depend only on a battery of a limited capacity. Therefore, a case in which power of the AP is exhausted may also occur. Therefore, an energy conserved operation method similar to that of a STA may be used for the AP to save energy. Therefore, a wake-up method needs to be provided to reduce a transmission latency caused by sleep of the AP.

Figure 3:
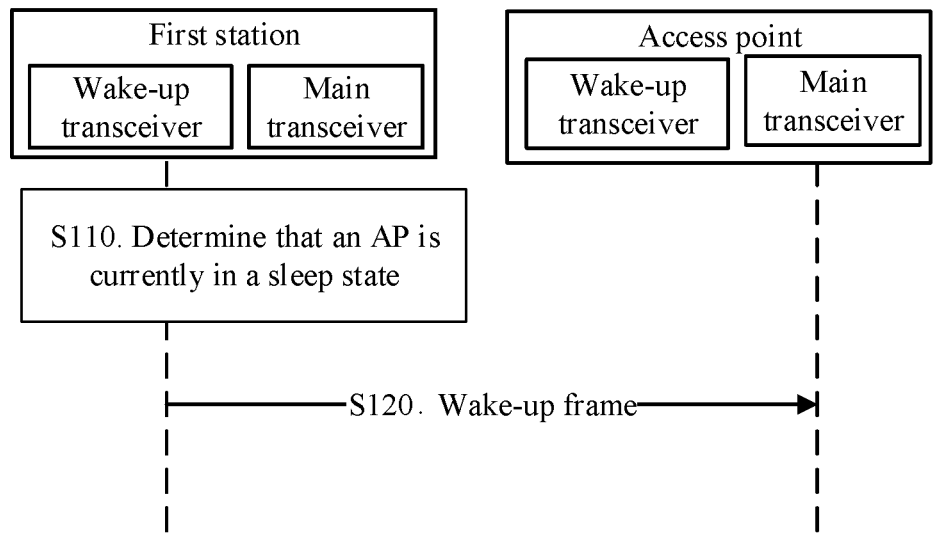
FIG. 3 is a schematic flowchart of a wake-up method according to an embodiment of this application.

FIG. 3 shows a wake-up method according to an embodiment of this application. The wake-up method is applied to the communications system shown in FIG. 1. An access point in the communications system shown in FIG. 1 includes a wake-up transceiver WUR and a main transceiver. As shown in FIG. 3, the method 100 includes:

S110. A first STA determines that an AP is currently in a sleep state, where when the AP is in the sleep state, a main transceiver of the AP is in an off state.

S120. The first STA transmits a wake-up frame to a WUR of the AP, where the wake-up frame is used to trigger the WUR of the AP to wake up the main transceiver of the AP.

Therefore, in the wake-up method in this embodiment of this application, the station can transmit the wake-up frame to the access point to wake up the access point and transmit data, and does not need to wait until expiry of a preset sleep time of the access point before transmitting the data to the access point. Therefore, an uplink data transmission latency can be reduced.

It may be understood that, before the AP enters the sleep state, capability interaction may be performed between the AP and the STA, so that the STA knows whether the AP can be woken up, and that the AP knows whether the STA has a wake-up capability of transmitting a wake-up frame.

For example, the first STA may transmit a first capability information frame to the main transceiver of the AP, where the first capability information frame carries first indication information, and the first indication information is used to indicate whether the first STA has a capability of transmitting a wake-up frame. The AP may transmit a second capability information frame to the first STA, where the second capability information frame carries second indication information and/or third indication information, the second indication information is used to indicate whether the AP includes the WUR, and the third indication information is used to indicate whether the AP can be woken up by the first STA. The first STA transmits the wake-up frame to the AP when determining, based on the second indication information and/or the third indication information, that the AP can be woken up.

Further, the AP may transmit a wake-up identifier (Wake-up ID) to the STA, so that the STA transmits the wake-up frame to the AP based on the wake-up ID, where the wake-up frame carries the wake-up ID, and the wake-up ID may be an identifier of the WUR of the AP. Optionally, the AP transmits the second capability information frame carrying the wake-up ID to the STA.

Figure 4:
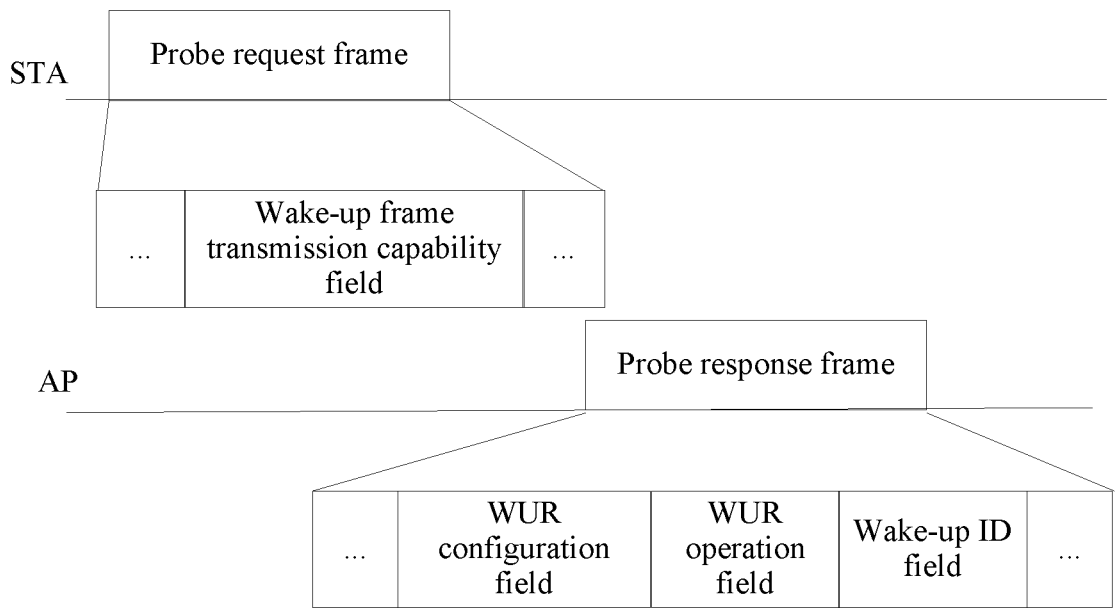
FIG. 4 is a schematic diagram of a probe request frame and a probe response frame according to an embodiment of this application.

Specifically, the first STA may transmit a probe request frame to the AP. As shown in FIG. 4, the probe request frame includes a wake-up frame transmission capability field, where the wake-up frame transmission capability field is used to indicate whether the first STA has the capability of transmitting a wake-up frame. Correspondingly, the AP may transmit a probe response frame to the first STA, where the probe response frame includes at least one of a WUR configuration field, a WUR operation field, and a wake-up ID field. For example, the probe response frame shown in FIG. 4 includes the three fields, where the WUR configuration field is used to indicate whether the AP includes the WUR, the WUR operation field is used to indicate whether the AP can be woken up, and the wake-up ID field is used to indicate the wake-up ID.

Figure 5:
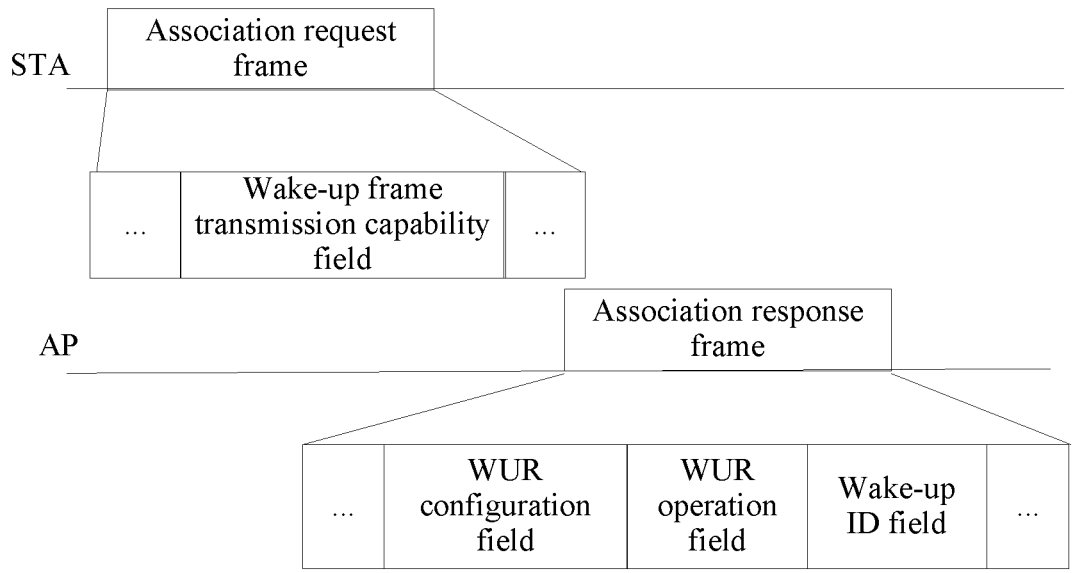
FIG. 5 is a schematic diagram of an association request frame and an association response frame according to an embodiment of this application.

Alternatively, the first STA may transmit an association request frame to the AP. As shown in FIG. 5, the association request frame includes a wake-up frame transmission capability field, where the wake-up frame transmission capability field is used to indicate whether the first STA has a capability of transmitting a wake-up frame. Correspondingly, the AP may transmit an association response frame to the first STA, where the association response frame includes at least one of a WUR configuration field, a WUR operation field, and a wake-up ID field. For example, the association response frame shown in FIG. 5 includes the three fields, where the WUR configuration field is used to indicate whether the AP includes the WUR, the WUR operation field is used to indicate whether the AP can be woken up, and the wake-up ID field is used to indicate the wake-up ID.

Figure 6:
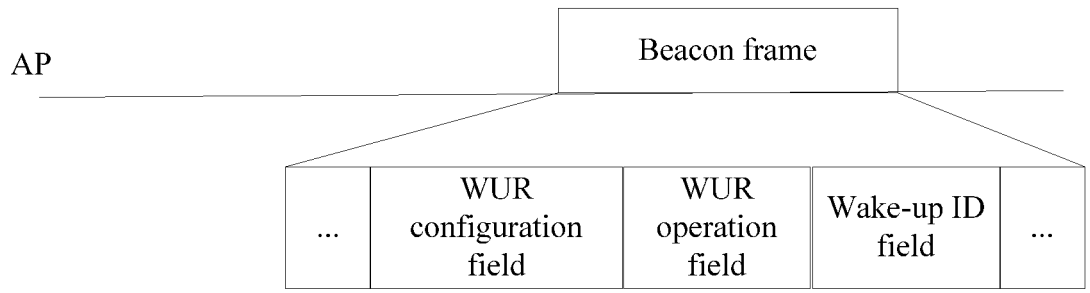
FIG. 6 is a schematic diagram of a beacon frame according to an embodiment of this application.

Alternatively, the AP may first transmit a beacon frame to the first STA, where the beacon frame includes at least one of a WUR configuration field, a WUR operation field, and a wake-up ID field. For example, the beacon frame shown in FIG. 6 includes the three fields, where the WUR configuration field is used to indicate whether the AP includes the WUR, the WUR operation field is used to indicate whether the AP can be woken up, and the wake-up ID field is used to indicate the wake-up ID.

Therefore, through the wake-up capability interaction between the AP and the STA, a capability guarantee is provided for using the wake-up method in this embodiment of this application.

In this embodiment of this application, optionally, before the AP enters the sleep state, the AP notifies all STAs that the AP will enter the sleep state, so that the STA learns the status of the AP. The AP transmits a sleep notification frame to the STA by using the main transceiver, where the sleep notification frame carries sleep state indication information, and the sleep state indication information is used to indicate information related to the sleep state.

Specifically, the sleep notification frame includes fourth indication information, where the fourth indication information indicates that the AP will enter the sleep state after the AP has transmitted the sleep notification frame. The WUR of the AP in a sleep period is on, and the STA may wake up the AP by transmitting a wake-up frame. The fourth indication information may be reflected by a frame type. To be specific, a specific frame type is used to identify that the AP will enter the sleep state. The fourth indication information may be further reflected by a specific information field. For example, if a value of the specific information field is 1, it indicates that the AP will enter the sleep state; or if a value is 0, it indicates that the AP will not enter the sleep mode.

Figure 7:
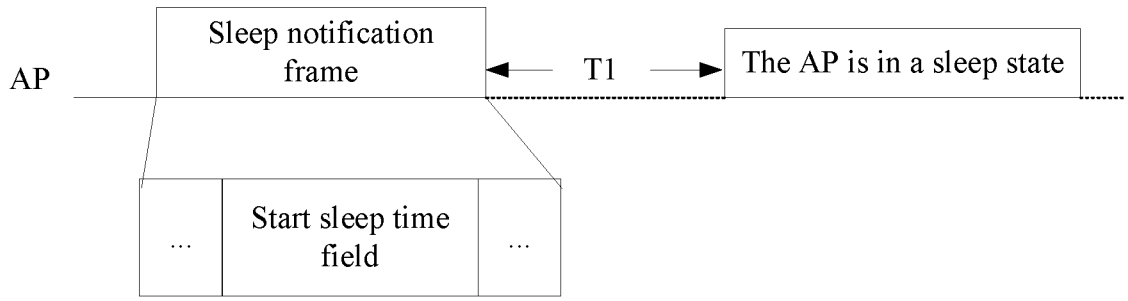
FIG. 7 is a schematic diagram of a sleep notification frame according to an embodiment of this application.
Figure 8:
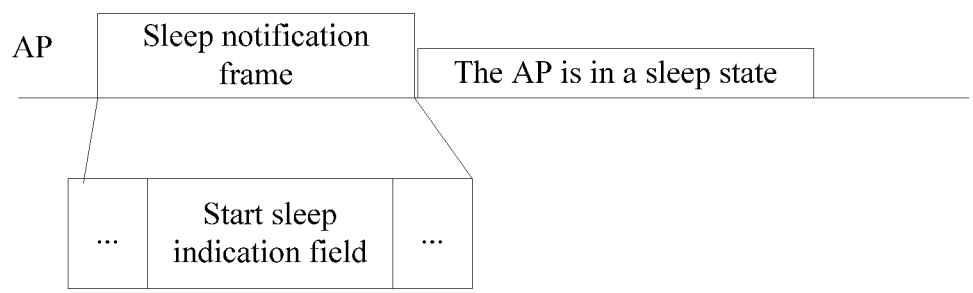
FIG. 8 is another schematic diagram of a sleep notification frame according to an embodiment of this application.

Optionally, the AP may sleep based on a preset sleep time. For example, it may be specified in advance that the AP enters the sleep state after a time unit (for example, a timeslot) starting from a time at which the sleep notification frame has been transmitted. Alternatively, the AP adds fifth indication information to the sleep notification frame, where the fifth indication information is used to indicate a time at which the AP starts to sleep. For example, as shown in FIG. 7, the sleep notification frame includes a start sleep time field, where the start sleep time field is used to carry the fifth indication information. A value T1 of the start sleep time field indicates the time at which the AP starts to sleep, and the value T1 may be a time relative to the sleep notification frame, or may be an absolute system time. Alternatively, as shown in FIG. 8, the sleep notification frame includes a start sleep indication field, where the start sleep indication field is used to carry the fifth indication information. The start sleep indication field may include an information bit. When a value of the information bit is 1, it indicates that the AP immediately enters the sleep mode after the sleep notification frame has been transmitted.

Figure 9:
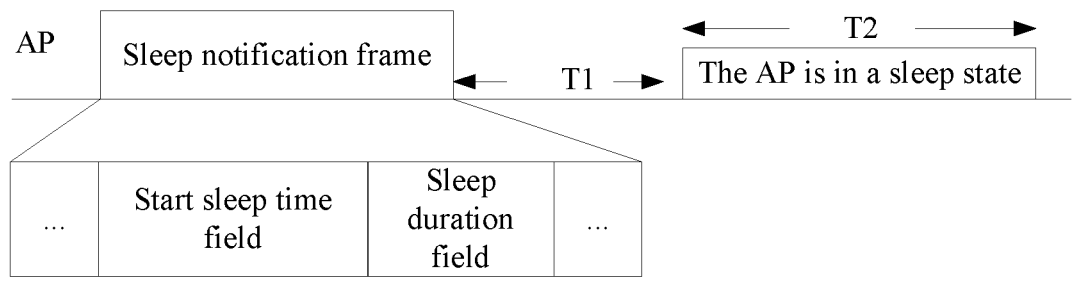
FIG. 9 is still another schematic diagram of a sleep notification frame according to an embodiment of this application.

Further, after the AP enters the sleep state, the AP may wake up after a preset sleep duration. Alternatively, the AP adds sixth indication information to the sleep notification frame, where the sixth indication information is used to indicate a duration in which the AP is in the sleep state. For example, as shown in FIG. 9, the sleep notification frame further includes a sleep duration field, where the sleep duration field carries sixth indication information, and the sixth indication information indicates that a duration in which the AP sleeps is T2. The AP will return to an active state after a time T2 starting from entering the sleep state.

Figure 10:
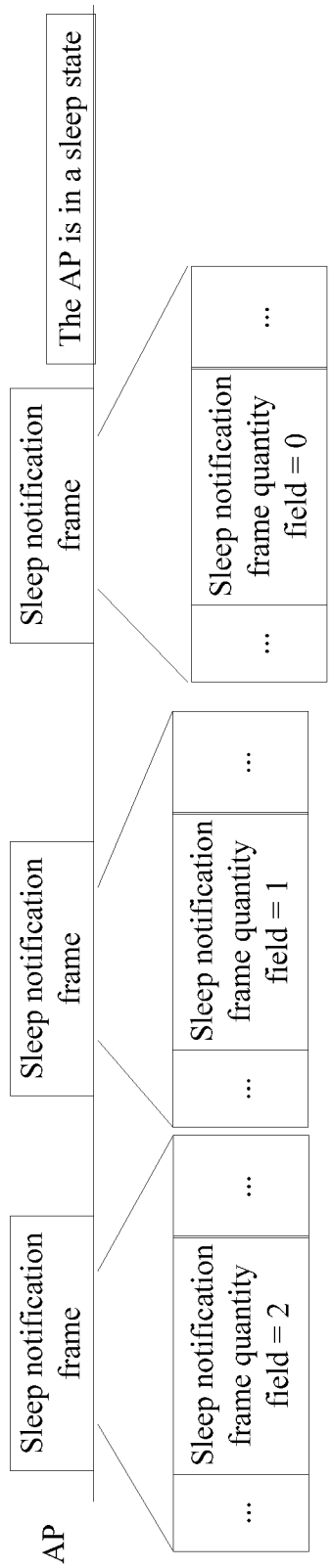
FIG. 10 is still another schematic diagram of a sleep notification frame according to an embodiment of this application.

In the foregoing embodiment, optionally, to ensure that all STAs can receive the sleep notification frame, before entering the sleep state, the AP transmits a plurality of sleep notification frames to the STA. In addition, the AP may periodically transmit the sleep notification frame to the STA. In this case, the sleep notification frame includes a sleep notification frame quantity field, where the sleep notification frame quantity field carries seventh indication information, and the seventh indication information is used to indicate a quantity of sleep notification frames that the STA further needs to receive after the STA has received the current sleep notification frame. For example, as shown in FIG. 10, when a value of the sleep notification frame quantity field is 2, it indicates that two sleep notification frames need to be received subsequently; or when a value of the sleep notification frame quantity field is 0, it indicates that the currently received sleep notification frame is a last sleep notification frame that needs to be received, and the AP may enter the sleep state after the sleep notification frame has been transmitted.

In this embodiment of this application, optionally, the AP transmits the sleep notification frame to the STA by broadcast, or transmits the sleep notification frame to each STA by unicast.

It should be noted that, after the AP enters the sleep state, the WUR of the AP may be always on, or may be periodically off and on. To ensure that the WUR is on when the STA transmits the wake-up frame, the STA needs to know a time at which the WUR of the AP is on.

Optionally, in an example, the AP and the STA pre-agree upon a work mode of the WUR of the AP when the AP is in the sleep state. The STA may learn, based on the pre-agreed work mode, when the WUR of the AP is on.

Optionally, in another example, the AP adds eighth indication information to the sleep notification frame, where the eighth indication information indicates a work mode of the WUR of the AP in a time period in which the AP is in the sleep state, and the work mode includes an always-on work mode and a periodically-on work mode.

Further, when the eighth indication information indicates that the work mode of the WUR of the AP is the periodically-on work mode when the AP is in the sleep state, the sleep notification frame further carries ninth indication information, and the ninth indication information indicates a time period in which the WUR of the AP is in an on state.

Figure 11:
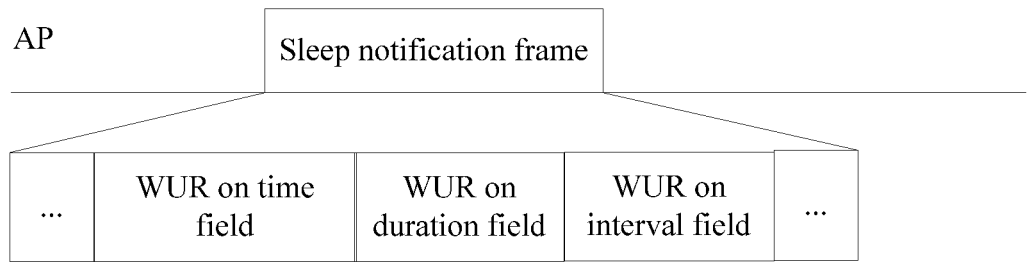
FIG. 11 is still another schematic diagram of a sleep notification frame according to an embodiment of this application.

For example, when the AP is in the sleep state, the WUR of the AP is periodically on. The sleep notification frame includes at least one of a WUR on time field, a WUR on duration field, and a WUR on interval field. For example, as shown in FIG. 11, the sleep notification frame includes the three fields, where the WUR on time field indicates a start time T0 at which the WUR is on, the WUR on duration field indicates a duration T1 after the WUR is turned on, and the WUR on interval field indicates a period T2 in which the WUR is on.

Alternatively, the WUR may not be periodically on. In this case, the sleep notification frame carries a start time at which the WUR is on and a duration after the WUR is turned on.

In the foregoing embodiment, optionally, the sleep notification frame may be a beacon frame or a delivery traffic indication map (DTIM) beacon frame. The fourth indication information to the ninth indication information exist in forms of information elements (IE) in the beacon frame or the DTIM beacon frame.

Optionally, the eighth indication information or the ninth indication information may be carried in a target wake time (TWT) IE defined in the 802.11ax standard. In addition, to distinguish from a time indicated by a conventional TWT IE, a new flow ID in the TWT IE is used to indicate a time period in which the WUR of the AP is on. For example, a value 3 of a TWT flow field may be used to indicate the time period in which the WUR is on.

Further, because the station transmits the wake-up frame only when the WUR of the AP is in the on state, the AP can successfully receive the wake-up frame. Therefore, to prevent too many STAs from contending for a channel for transmitting wake-up frames at the beginning of a phase in which the WUR of the AP is on, the AP adds contention window size (CW Size) information to the sleep notification frame. When a STA contends for a channel for transmitting a wake-up frame, the STA generates a random backoff value based on the CW size. Setting an appropriate CW size can effectively decentralize backoff values of the STAs and reduce a collision probability.

In this embodiment of this application, optionally, after the AP enters the sleep state, if the STA needs to transmit uplink data, the STA transmits the wake-up frame carrying a buffer status report (BSR) to the AP, where the BSR is used to indicate a type of data that the STA needs to transmit and a size of the data. Then the AP transmits a response frame to the STA, where the response frame carries resource allocation information and/or acknowledgement information. The resource allocation information is determined by the AP based on the BSR. The resource allocation information may specifically include one or more pieces of information such as a duration that may be used when the STA transmits a data frame, a channel bandwidth, a modulation and coding scheme (MCS) that needs to be used, a quantity of spatial flows that may be transmitted, and transmit power.

The acknowledgement information is used to indicate that the AP successfully receives the wake-up frame transmitted by the STA.

It may be understood that, after waking up the AP, the STA may further transmit a control frame and/or a management frame to the AP.

In this embodiment of this application, when the AP in the sleep state needs to transmit downlink data to the STA, the AP needs to transmit the downlink data to the STA based on a work mode of the STA. Therefore, the AP needs to know the work mode of the STA when the AP is in the sleep state. Optionally, the AP and the STA may pre-agree upon the work mode of the STA when the AP is in the sleep state. Alternatively, the STA reports, by transmitting a first work mode information frame to the AP, the work mode of the STA to the AP when the AP is in the sleep state.

Specifically, when the AP is in the sleep state, the STA mainly has three work modes. Work mode 1: The STA keeps a wake-up state, that is, the STA keeps a main transceiver in the always-on state. Work mode 2: The STA is in the sleep state, but a wake-up transceiver of the STA is in the on state and may receive a wake-up frame. Work mode 3: The STA is in a power save mode in a conventional 802.11 system. Correspondingly, when the AP learns that the work mode of the STA is the work mode 1, the AP directly transmits a downlink data frame to the STA. When the AP learns that the work mode of the STA is the work mode 2, the AP first transmits a wake-up frame to the STA to wake up the STA, and then transmits a downlink data frame to the STA. When the AP learns that the work mode of the STA is the work mode 3, the AP transmits a beacon frame carrying traffic indication map (TIM) information to the STA, and waits for the STA to transmit a PS-poll frame to solicit a downlink data frame.

In this embodiment of this application, optionally, the STA transmits a second work mode information frame to the AP, where the second work mode information frame carries second work mode indication information, and the second work mode indication information is used to indicate whether the AP can transmit a data frame to the STA in the time period in which the AP is in the sleep state. Therefore, when the STA wishes to achieve a better energy saving effect, the STA instructs, by using the second work mode indication information, the AP not to wake up to transmit downlink data to the STA in the time period in which the AP is in the sleep state. Alternatively, when the STA wishes to obtain a lower transmission latency, the STA instructs, by using the second work mode indication information, the AP to wake up to transmit downlink data to the STA in the time period in which the AP is in the sleep state.

Optionally, in an example, the first work mode information frame and/or the second work mode information frame are/is an association request frame, or the first work mode information frame and/or the second work mode information frame are/is a newly defined operation work mode management frame.

In this embodiment of this application, optionally, after the AP is woken up, the AP transmits a wake-up declaration frame by using the main transceiver, where the wake-up declaration frame carries wake-up declaration information, and the wake-up declaration information is used to indicate that the main transceiver of the AP is in the wake-up state. Alternatively, it may be understood that, the wake-up declaration information is used to indicate that the AP is in the active state. Therefore, after the AP is woken up by a STA, the AP may notify other STAs that the AP has been woken up, and the other STAs may directly transmit uplink data to the AP, thereby reducing a data transmission latency.

Alternatively, collision occurs when a plurality of STAs simultaneously contend for a channel and simultaneously transmit wake-up frames, and consequently, the AP cannot successfully receive the wake-up frames. However, because preamble parts of the wake-up frames are a same signal, a signal obtained by superposing a plurality of wake-up frames still has the same preamble. Therefore, the AP can still detect arrival of a wake-up frame, and learn that a STA needs to wake up the AP. In this case, the AP may actively wake up the main transceiver, and transmit a wake-up declaration frame to the STA.

In this embodiment of this application, optionally, when a plurality of STAs need to wake up the AP, a STA may act as a representative to help other STAs wake up the AP. Herein the STA acting as the representative is a cluster head in a STA cluster, or a relay STA. This can reduce a quantity of transmitted wake-up frames, and improve resource utilization.

In an example, the first STA determines an uplink transmission requirement of at least one second STA; and then the first STA transmits a wake-up frame carrying data transmission requirement information to the WUR of the AP, where the data transmission requirement information is used to indicate the uplink transmission requirement of the at least one second STA, and the data transmission requirement information may be BSR information. Then the AP transmits a trigger frame including resource allocation information to the first STA and the at least one second STA, triggering the first STA and the at least one second STA to transmit an uplink data frame.

Specifically, that the first STA determines an uplink transmission requirement of at least one second STA may be that the first STA transmits a query frame to the at least one second STA, where the query frame is used to query whether the at least one second STA has an uplink transmission requirement and BSR information. Alternatively, a trigger frame may be transmitted to the at least one second STA, triggering the at least one second STA to transmit an uplink transmission requirement and BSR information to the first STA.

In another example, after the first STA determines an uplink transmission requirement of at least one second STA, after communication between the first STA and the AP is complete, the first STA notifies the AP that another STA needs to communicate with the AP.

Specifically, after the first STA transmits the wake-up frame to the AP to wake up the AP, the first STA transmits an information frame to the main transceiver of the AP, where the information frame carries data transmission requirement information, and the data transmission requirement information is used to indicate the uplink transmission requirement of the at least one second STA. After receiving the information frame transmitted by the first STA, the AP keeps the wake-up state in a time period, and waits for receiving a data frame transmitted by another STA. A value of the time period may be a value specified in advance by a standard, or may be a value notified by the AP to the STA by using another information frame.

In this embodiment of this application, optionally, after a STA completes transmission of an uplink data frame, if a transmission opportunity (TXOP) is not used up, the STA may grant a remaining transmission opportunity (that is, a remaining transmission time) to another STA for use. For example, the STA transmits a grant frame to another STA, where the grant frame carries TXOP grant information; and after the another STA receives the grant frame, the another STA may not contend for a channel, but directly transmits uplink data based on the grant information. The grant information may be a time period. Therefore, the another STA may directly transmit the uplink data in a time period indicated by the grant information.

In this embodiment of this application, when a lot of stations need to transmit wake-up frames, collision may occur in transmission of the wake-up frames. To avoid collision, this application provides another wake-up method.

Figure 12:
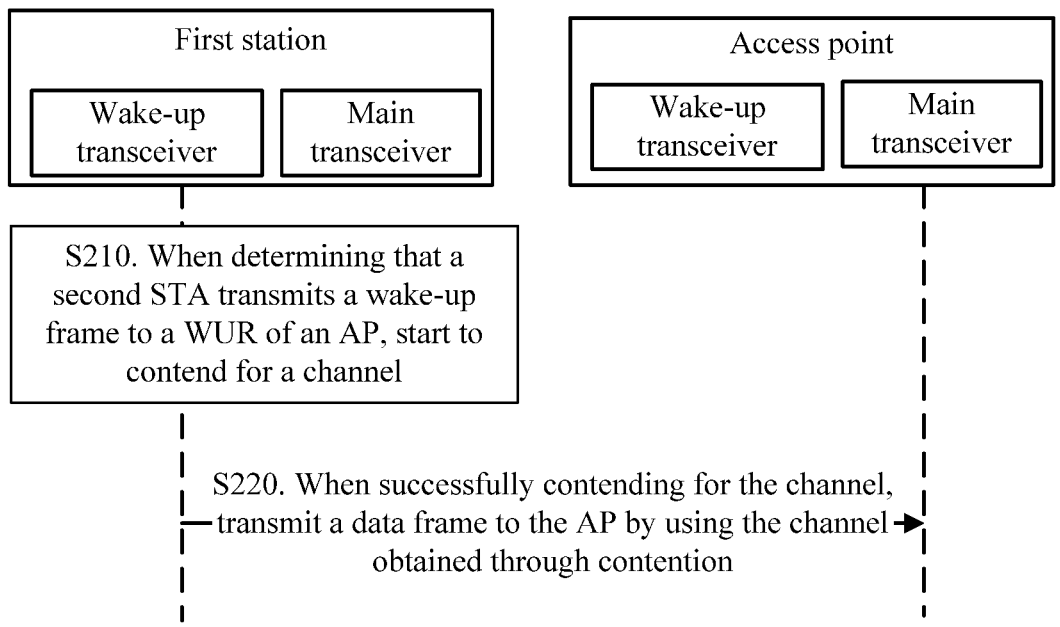
FIG. 12 is a schematic flowchart of a wake-up method according to another embodiment of this application.

FIG. 12 shows a wake-up method according to another embodiment of this application. The wake-up method is applied to the communications system shown in FIG. 1. An access point in the communications system shown in FIG. 1 includes a wake-up transceiver WUR and a main transceiver. As shown in FIG. 12, the method 200 includes:

S210. When a first STA determines that a second STA transmits a wake-up frame to a WUR of an AP, the first STA starts to contend for a channel.

S220. When the first STA successfully contends for the channel, the first STA transmits a data frame to the AP by using the channel obtained through contention.

Specifically, when a STA contends for a channel for transmitting a wake-up frame, other STAs keep listening, and after detecting the wake-up frame transmitted by the STA, the other STAs do not need to transmit wake-up frames any longer, but directly contend for a channel, and transmit uplink data by using the channel obtained through contention.

Optionally, after the first STA determines that the AP transmits a response frame to the second STA, the first STA starts to contend for the channel, where the response frame carries acknowledgement information and/or trigger information, the acknowledgement information is used to acknowledge the wake-up frame, and the trigger information is used to trigger the second STA to transmit a data frame.

Further, when the first STA determines that the second STA transmits the wake-up frame to the AP or the first STA determines that the AP transmits the response frame to the second STA, the first STA starts a timer. When the first STA successfully contends for the channel, the first STA determines whether the timer has expired. If the timer has not expired, the first STA transmits uplink data by using the channel obtained through contention. If the timer has expired, the first STA transmits a wake-up frame to the AP to wake up the AP and then transmit uplink data to the AP.

Optionally, a duration of the timer may be a value specified by a standard, or may be transmitted by the AP to the first STA by broadcast or unicast. For example, the response frame transmitted by the AP carries duration information, and the first STA determines the timing duration of the timer based on the duration information.

Figure 13:
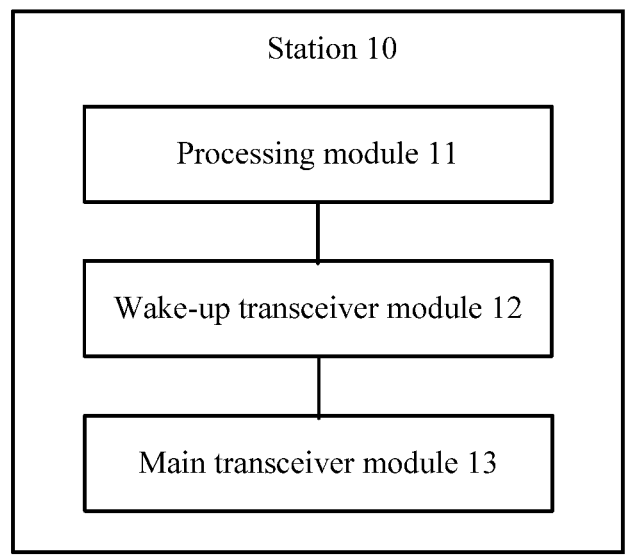
FIG. 13 is a schematic block diagram of a station according to an embodiment of this application.

The foregoing describes in detail the wake-up methods according to the embodiments of this application with reference to FIG. 3 to FIG. 12. The following describes in detail a station according to an embodiment of this application with reference to FIG. 13. The STA is applied to a communications system. The communications system includes an access point AP and at least one STA. The at least one STA includes the STA. The AP includes a wake-up transceiver WUR and a main transceiver. As shown in FIG. 13, the station 10 includes a processing module 11, a wake-up transceiver module 12, and a main transceiver module 13.

The processing module 11 is configured to determine that the AP is currently in a sleep state, where when the AP is in the sleep state, the main transceiver of the AP is in an off state.

The wake-up transceiver module 12 is configured to transmit a wake-up frame to the WUR of the AP, where the wake-up frame is used to trigger the WUR of the AP to wake up the main transceiver of the AP.

Therefore, when the station according to this embodiment of this application determines that the access point is in the sleep state, the station can wake up the access point by transmitting the wake-up frame, and then transmit uplink data, thereby reducing an uplink data transmission latency.

In this embodiment of this application, optionally, the main transceiver module 13 is configured to transmit a first capability information frame to the main transceiver of the AP, where the first capability information frame carries first indication information, and the first indication information is used to indicate whether the STA has a capability of transmitting a wake-up frame.

In this embodiment of this application, optionally, the main transceiver module 13 is configured to receive a second capability information frame transmitted by the AP by using the main transceiver of the AP, where the second capability information frame carries second indication information and/or third indication information, the second indication information is used to indicate whether the AP includes the WUR, and the third indication information is used to indicate whether the AP can be woken up by the STA.

In this embodiment of this application, optionally, before the wake-up transceiver module transmits the wake-up frame to the WUR of the AP, the processing module 11 is further configured to: determine, based on the second indication information, that the AP includes the WUR; or determine, based on the third indication information, that the AP can be woken up by the STA.

In this embodiment of this application, optionally, the second capability information frame further carries a wake-up identifier, and the wake-up identifier is used to identify the WUR of the AP; and the wake-up transceiver module 12 is specifically configured to transmit the wake-up frame to the WUR of the AP based on the wake-up identifier.

In this embodiment of this application, optionally, the wake-up frame carries the wake-up identifier.

In this embodiment of this application, optionally, the main transceiver module 13 is further configured to receive a sleep notification frame transmitted by the AP by using the main transceiver of the AP, where the sleep notification frame carries sleep state indication information, and the sleep state indication information is used to indicate information related to the sleep state; and the processing module 11 is specifically configured to determine, based on the sleep state indication information, that the AP is currently in the sleep state.

In this embodiment of this application, optionally, the sleep state indication information includes at least one of the following indication information: fourth indication information, fifth indication information, and sixth indication information, where the fourth indication information is used to indicate that the AP enters the sleep state after the AP has transmitted the sleep notification frame, the fifth indication information is used to indicate a time at which the AP starts to enter the sleep state, and the sixth indication information is used to indicate a duration in which the AP is in the sleep state.

In this embodiment of this application, optionally, the sleep state indication information includes seventh indication information, and the seventh indication information is used to indicate a quantity of sleep notification frames that the STA further needs to receive in a receive period of the sleep notification frame after the STA has received the sleep notification frame.

In this embodiment of this application, optionally, the sleep state indication information includes eighth indication information, the eighth indication information is used to indicate a work mode of the WUR of the AP in a time period in which the AP is in the sleep state, and the work mode includes an always-on work mode and a periodically-on work mode.

In this embodiment of this application, optionally, the eighth indication information indicates that the work mode of the WUR of the AP is the periodically-on work mode in the time period in which the AP is in the sleep state, the sleep state indication information further includes ninth indication information, and the ninth indication information is used to indicate a time period in which the WUR of the AP is in an on state; and the wake-up transceiver module 12 is specifically configured to transmit the wake-up frame to the WUR of the AP in the time period indicated by the ninth indication information.

In this embodiment of this application, optionally, the sleep state indication information further includes contention window size information, and the contention window size information is used to indicate a size of a contention window; and the wake-up transceiver module 12 is specifically configured to: determine a transmit time of the wake-up frame based on the size of the contention window in the time period in which the WUR of the AP is in the on state; and transmit the wake-up frame to the WUR of the AP at the transmit time of the wake-up frame.

In this embodiment of this application, optionally, the wake-up frame carries a buffer status report BSR, and the BSR is used to indicate a type of data that the STA needs to transmit and a size of the data.

In this embodiment of this application, optionally, the main transceiver module 13 is further configured to: receive a response frame transmitted by the AP by using the main transceiver of the AP, where the response frame carries resource allocation information and/or acknowledgement information, the resource allocation information is determined by the AP based on the BSR, and the acknowledgement information is used to indicate that the AP successfully receives the wake-up frame; and transmit information to the main transceiver of the AP based on the response frame.

In this embodiment of this application, optionally, the main transceiver module 13 is further configured to transmit a first work mode information frame to the main transceiver of the AP, where the first work mode information frame carries first work mode indication information, and the first work mode indication information is used to indicate a work mode of the STA in the time period in which the AP is in the sleep state.

In this embodiment of this application, optionally, the main transceiver module 13 is further configured to transmit a second work mode information frame to the main transceiver of the AP, where the second work mode information frame carries second work mode indication information, and the second work mode indication information is used to indicate whether the AP can transmit a data frame to the STA in the time period in which the AP is in the sleep state.

In this embodiment of this application, optionally, the main transceiver module 13 is further configured to receive a wake-up declaration frame transmitted by the AP by using the main transceiver of the AP, where the wake-up declaration frame carries wake-up declaration information, and the wake-up declaration information is used to indicate that the main transceiver of the AP is in a wake-up state.

In this embodiment of this application, optionally, the processing module 11 is further configured to determine an uplink transmission requirement of at least one second STA; and the wake-up transceiver module is specifically configured to transmit the wake-up frame carrying data transmission requirement information to the WUR of the AP, where the data transmission requirement information is used to indicate the uplink transmission requirement of the at least one second STA.

In this embodiment of this application, optionally, the processing module 11 is further configured to determine an uplink transmission requirement of at least one second STA; and after the wake-up transceiver module 12 transmits the wake-up frame to the WUR of the AP, the main transceiver module 13 is further configured to transmit an information frame to the main transceiver of the AP, where the information frame carries data transmission requirement information, and the data transmission requirement information is used to indicate the uplink transmission requirement of the at least one second STA.

In this embodiment of this application, optionally, the main transceiver module 13 is further configured to transmit a transmission opportunity TXOP grant frame to a third STA, where the TXOP grant frame carries TXOP grant information, and the TXOP grant information is used to instruct the third STA to transmit data to the AP in a time period corresponding to a transmission opportunity of the STA.

The station 10 according to this embodiment of this application may correspond to the station in the method in the embodiment of this application. In addition, the foregoing and other operations and/or functions of each module in the station are respectively intended to implement a corresponding procedure of the method 100. For brevity, details are not described again herein.

Therefore, when the station according to this embodiment of this application determines that the access point is in the sleep state, the station can wake up the access point by transmitting the wake-up frame, and then transmit uplink data, thereby reducing an uplink data transmission latency.

Figure 14:
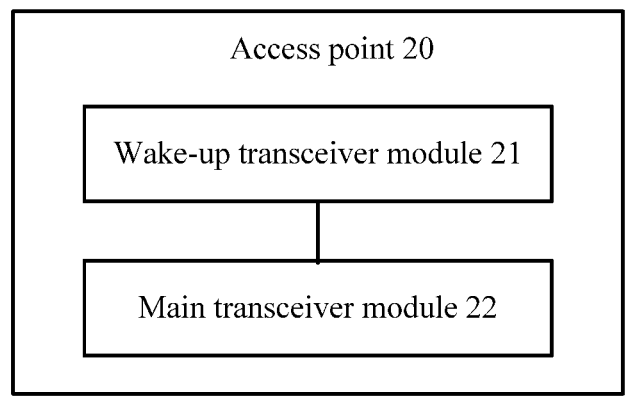
FIG. 14 is a schematic block diagram of an access point according to an embodiment of this application.

FIG. 14 shows an access point according to an embodiment of this application. The access point is applied to a communications system. The communications system includes the AP and at least one station STA. As shown in FIG. 14, the access point 20 includes a wake-up transceiver module 21 and a main transceiver module 22.

The wake-up transceiver module 21 is configured to receive a wake-up frame transmitted by a first STA, where the wake-up frame is used to trigger the wake-up transceiver module 21 to wake up the main transceiver module 22.

The wake-up transceiver module 21 is further configured to wake up the main transceiver module 22 based on the wake-up frame.

Therefore, the access point according to this embodiment of this application can receive the wake-up frame transmitted by the station, and wake up, by using the WUR, the main transceiver based on the wake-up frame. Therefore, when the station needs to transmit uplink data, an uplink data transmission latency can be reduced.

In this embodiment of this application, optionally, the main transceiver module 22 is configured to receive a first capability information frame transmitted by the first STA, where the first capability information frame carries first indication information, and the first indication information is used to indicate whether the first STA has a capability of transmitting a wake-up frame.

In this embodiment of this application, optionally, the main transceiver module 22 is further configured to transmit a second capability information frame to the first STA, where the second capability information frame carries second indication information and/or third indication information, the second indication information is used to indicate whether the AP includes the wake-up transceiver module 21, and the third indication information is used to indicate whether the AP can be woken up by the first STA.

In this embodiment of this application, optionally, the second capability information frame further carries a wake-up identifier, and the wake-up identifier is used to identify the wake-up transceiver module 21 of the AP.

In this embodiment of this application, optionally, the wake-up frame carries the wake-up identifier.

In this embodiment of this application, optionally, the main transceiver module 22 is further configured to transmit a sleep notification frame to the first STA, where the sleep notification frame carries sleep state indication information, and the sleep state indication information is used to indicate information related to a sleep state.

In this embodiment of this application, optionally, the sleep state indication information includes at least one of the following indication information: fourth indication information, fifth indication information, and sixth indication information, where the fourth indication information is used to indicate that the AP enters the sleep state after the AP has transmitted the sleep notification frame, the fifth indication information is used to indicate a time at which the AP starts to enter the sleep state, and the sixth indication information is used to indicate a duration in which the AP is in the sleep state.

In this embodiment of this application, optionally, the sleep state indication information includes seventh indication information, and the seventh indication information is used to indicate a quantity of sleep notification frames that the first STA further needs to receive in a receive period of the sleep notification frame after the first STA has received the sleep notification frame.

In this embodiment of this application, optionally, the sleep state indication information includes eighth indication information, the eighth indication information is used to indicate a work mode of the wake-up transceiver module 21 in a time period in which the AP is in the sleep state, and the work mode includes an always-on work mode and a periodically-on work mode.

In this embodiment of this application, optionally, the eighth indication information indicates that the work mode of the wake-up transceiver module 21 is the periodically-on work mode in the time period in which the AP is in the sleep state, the sleep state indication information further includes ninth indication information, and the ninth indication information is used to indicate a time period in which the wake-up transceiver module 21 is in an on state.

In this embodiment of this application, optionally, the sleep state indication information further includes contention window size information, and the contention window size information is used to indicate a size of a contention window, so that the first STA determines a transmit time of the wake-up frame based on the size of the contention window in the time period in which the wake-up transceiver module 21 is in the on state.

In this embodiment of this application, optionally, the wake-up frame carries a buffer status report BSR, and the BSR is used to indicate a type of data that the first STA needs to transmit and a size of the data.

In this embodiment of this application, optionally, the main transceiver module 22 is further configured to transmit a response frame to the first STA, where the response frame carries resource allocation information and/or acknowledgement information, the resource allocation information is determined by the AP based on the BSR, and the acknowledgement information is used to indicate that the AP successfully receives the wake-up frame.

In this embodiment of this application, optionally, the main transceiver module 22 is further configured to: receive a first work mode information frame transmitted by the first STA, where the first work mode information frame carries first work mode indication information, and the first work mode indication information is used to indicate a work mode of the first STA in the time period in which the AP is in the sleep state; and transmit a data frame to the first STA based on the first work mode indication information.

In this embodiment of this application, optionally, the main transceiver module 22 is further configured to receive a second work mode information frame transmitted by the first STA, where the second work mode information frame carries second work mode indication information, and the second work mode indication information is used to indicate whether the AP can transmit a data frame to the first STA in the time period in which the AP is in the sleep state.

In this embodiment of this application, optionally, the main transceiver module 22 is further configured to transmit a wake-up declaration frame to the first STA, where the wake-up declaration frame carries wake-up declaration information, and the wake-up declaration information is used to indicate that the main transceiver module is in a wake-up state.

In this embodiment of this application, optionally, the wake-up frame carries data transmission requirement information, and the data transmission requirement information is used to indicate an uplink transmission requirement of at least one second STA; and the main transceiver module 22 is further configured to transmit a trigger frame to the first STA and the at least one second STA, where the trigger frame is used to trigger the first STA and the at least one second STA to transmit data.

In this embodiment of this application, optionally, after the wake-up transceiver module receives the wake-up frame transmitted by the first STA, the main transceiver module 22 is further configured to: receive an information frame transmitted by the first STA, where the information frame carries data transmission requirement information, and the data transmission requirement information is used to indicate an uplink transmission requirement of at least one second STA; and receive, in a preset time period, uplink data transmitted by the at least one second STA.

In this embodiment of this application, optionally, the main transceiver module 22 is further configured to receive data transmitted by a third STA to the AP in a time period corresponding to a transmission opportunity of the first STA.

The access point 20 according to this embodiment of this application may correspond to the access point in the method in the embodiment of this application. In addition, each unit in the access point 20 and the foregoing and other operations and/or functions of each module in the station are respectively intended to implement a corresponding procedure of the method 100. For brevity, details are not described again herein.

Therefore, the access point according to this embodiment of this application can receive the wake-up frame transmitted by the station, and wake up, by using the WUR, the main transceiver based on the wake-up frame. Therefore, when the station needs to transmit uplink data, an uplink data transmission latency can be reduced.

Figure 15:
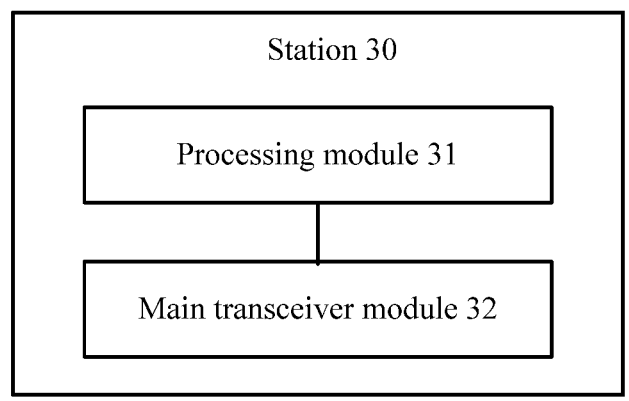
FIG. 15 is a schematic block diagram of a station according to another embodiment of this application.

FIG. 15 is a schematic block diagram of a station according to another embodiment of this application. The station is applied to a communications system. The communications system includes an access point AP and at least one STA. The at least one station includes the station. The AP includes a wake-up transceiver WUR and a main transceiver. As shown in FIG. 15, the station 30 includes a processing module 31 and a main transceiver module 32.

The processing module 31 is configured to start to contend for a channel when determining that a second STA transmits a wake-up frame to the WUR of the AP.

The main transceiver module 32 is configured to: when the processing module successfully contends for the channel, transmit a data frame to the AP by using the channel obtained through contention.

Therefore, when a station according to this embodiment of this application determines that another station transmits a wake-up frame to the access point, the station may not transmit a wake-up frame to the access point any longer, but directly contends for a channel, and transmits uplink data on the channel obtained through contention. Therefore, signaling overheads can be reduced, and an uplink data transmission latency can be reduced.

In this embodiment of this application, optionally, the processing module 31 is specifically configured to start to contend for the channel when determining that the AP transmits a response frame to the second STA, where the response frame carries acknowledgement information and/or trigger information, the acknowledgement information is used to acknowledge the wake-up frame, and the trigger information is used to trigger the second STA to transmit a data frame.

In this embodiment of this application, optionally, the processing module 31 is further configured to start a timer; and the main transceiver module 32 is specifically configured to: when the processing module 31 determines that the timer has not expired when the channel contention succeeds, transmit the data frame to the AP by using the channel obtained through contention.

In this embodiment of this application, optionally, the response frame carries duration information, and the processing module 31 is specifically configured to determine a timing duration of the timer based on the duration information.

The station 30 according to this embodiment of this application may correspond to the station in the method in the embodiment of this application. In addition, each module in the station 30 and the foregoing and other operations and/or functions of each module in the station are respectively intended to implement a corresponding procedure of the method 200. For brevity, details are not described again herein.

Therefore, when a station according to this embodiment of this application determines that another station transmits a wake-up frame to the access point, the station may not transmit a wake-up frame to the access point any longer, but directly contends for a channel, and transmits uplink data on the channel obtained through contention. Therefore, signaling overheads can be reduced, and an uplink data transmission latency can be reduced.

Figure 16:
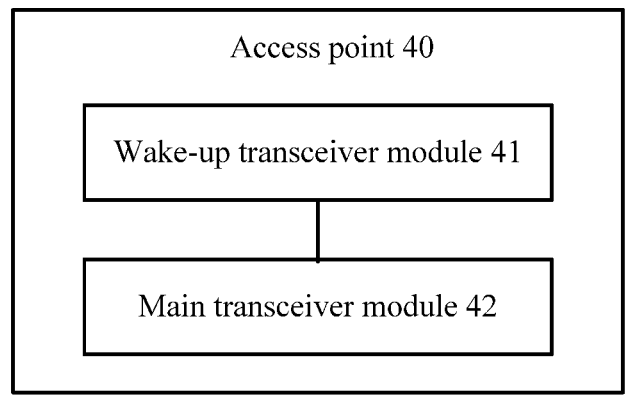
FIG. 16 is a schematic block diagram of an access point according to another embodiment of this application.

FIG. 16 is a schematic block diagram of an access point according to another embodiment of this application. The access point is applied to a communications system. The communications system includes the access point AP and at least one station STA. The AP 40 includes a wake-up transceiver module 41 and a main transceiver module 42.

The wake-up transceiver module 41 is configured to receive a wake-up frame transmitted by a second STA, where the wake-up frame is used to trigger the wake-up transceiver module 41 to wake up the main transceiver module 42.

The wake-up transceiver module 41 is further configured to wake up the main transceiver module 42 based on the wake-up frame.

The main transceiver module 42 is configured to receive a data frame transmitted by the second STA.

Therefore, when the access point according to this embodiment of this application is woken up by a wake-up frame transmitted by a station, the access point may receive uplink data transmitted by another station. Therefore, the another station does not need to transmit a wake-up frame to the access point any longer, but directly contends for a channel, and transmits the uplink data on the channel obtained through contention. Therefore, signaling overheads can be reduced, and an uplink data transmission latency can be reduced.

In this embodiment of this application, optionally, the main transceiver module 42 is further configured to transmit a response frame to the second STA, where the response frame carries acknowledgement information and/or trigger information, the acknowledgement information is used to acknowledge the wake-up frame, and the trigger information is used to trigger the second STA to transmit the data frame.

In this embodiment of this application, optionally, the response frame further carries duration information, so that a first STA determines a timing duration of a timer based on the duration information.

The access point 40 according to this embodiment of this application may correspond to the access point in the method in the embodiment of this application. In addition, each unit in the access point 40 and the foregoing and other operations and/or functions of each module in the station are respectively intended to implement a corresponding procedure of the method 200. For brevity, details are not described again herein.

Therefore, when the access point according to this embodiment of this application is woken up by a wake-up frame transmitted by a station, the access point may receive uplink data transmitted by another station. Therefore, the another station does not need to transmit a wake-up frame to the access point any longer, but directly contends for a channel, and transmits the uplink data on the channel obtained through contention. Therefore, signaling overheads can be reduced, and an uplink data transmission latency can be reduced.

Figure 17:
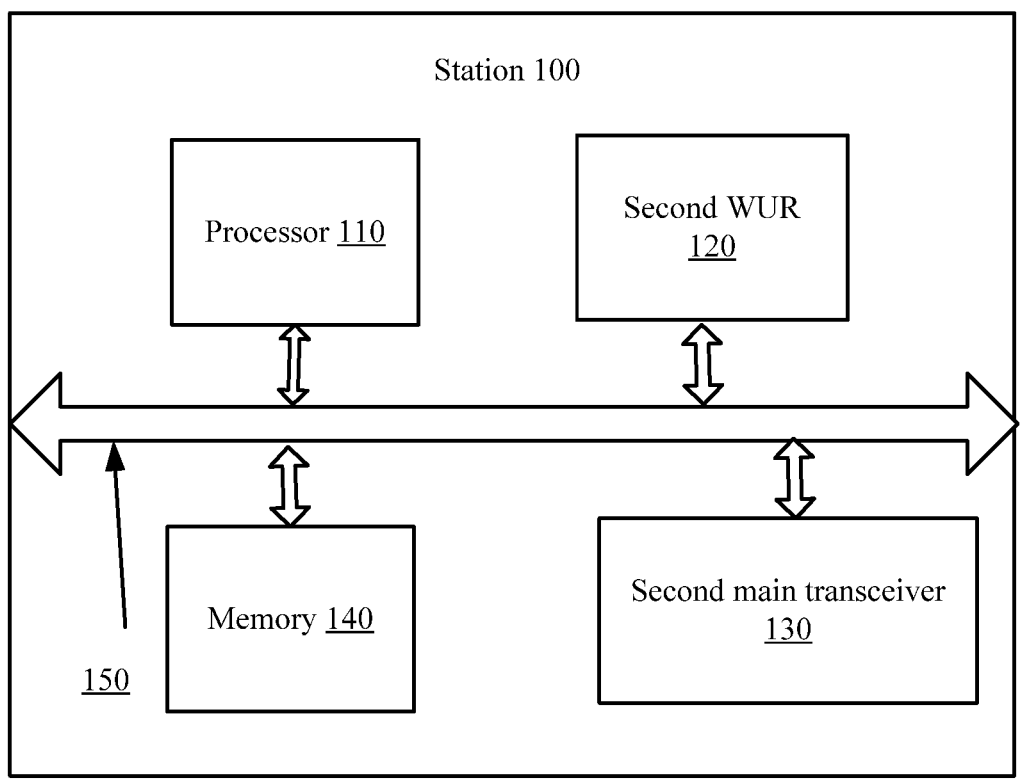
FIG. 17 is a schematic block diagram of a station according to still another embodiment of this application.

FIG. 17 is a schematic block diagram of a station according to still another embodiment of this application. The STA is applied to a communications system. The communications system includes an access point AP and at least one STA. The at least one STA includes the STA. The AP includes a first wake-up transceiver WUR and a first main transceiver. The station 100 includes a processor 110, a second WUR 120, a second main transceiver 130, and a memory 140. The processor 110 controls an operation of the station 100, and may be configured to process a signal. The memory 140 may include a read-only memory and a random access memory, and provide an instruction and data to the processor 110. Components of the station 100 are coupled together by using a bus system 150, where the bus system 150 includes a power bus, a control bus, and a status signal bus, in addition to a data bus. However, for clear description, various types of buses in the figure are marked as the bus system 150.

Specifically, the processor 110 is configured to determine that the AP is currently in a sleep state, where when the AP is in the sleep state, the first main transceiver of the AP is in an off state; and the second WUR 120 is configured to transmit a wake-up frame to the first WUR of the AP, where the wake-up frame is used to trigger the first WUR of the AP to wake up the first main transceiver of the AP.

It should be understood that, the station 100 according to this embodiment of this application may correspond to the station 10 in the embodiment of this application, and may correspond to a corresponding entity that performs the method according to the embodiment of this application. In addition, the foregoing and other operations and/or functions of each module in the station 100 are respectively intended to implement a corresponding procedure of the method 100. For brevity, details are not described again herein.

Therefore, when the station according to this embodiment of this application determines that the access point is in the sleep state, the station can wake up the access point by transmitting the wake-up frame, and then transmit uplink data, thereby reducing an uplink data transmission latency.

Alternatively, the processor 110 is configured to start to contend for a channel when determining that a second STA transmits a wake-up frame to the WUR of the AP; and the second main transceiver 130 is configured to: when the processor 110 successfully contends for the channel, transmit a data frame to the AP by using the channel obtained through contention.

It should be understood that, the station 100 according to this embodiment of this application may correspond to the station 20 in the embodiment of this application, and may correspond to a corresponding entity that performs the method according to the embodiment of this application. In addition, the foregoing and other operations and/or functions of each module in the station 100 are respectively intended to implement a corresponding procedure of the method 200. For brevity, details are not described again herein.

Therefore, when a station according to this embodiment of this application determines that another station transmits a wake-up frame to the access point, the station may not transmit a wake-up frame to the access point any longer, but directly contends for a channel, and transmits uplink data on the channel obtained through contention. Therefore, signaling overheads can be reduced, and an uplink data transmission latency can be reduced.

Figure 18:
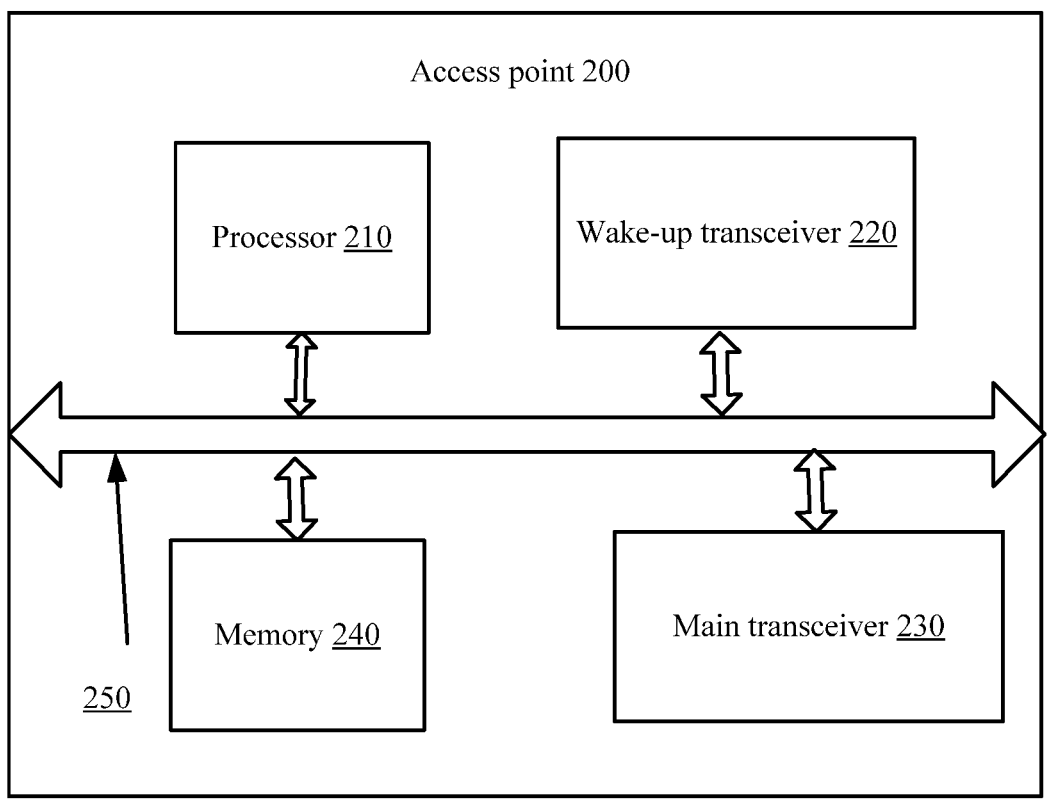
FIG. 18 is a schematic block diagram of an access point according to still another embodiment of this application.

FIG. 18 is a schematic block diagram of an access point according to still another embodiment of this application. The access point is applied to a communications system. The communications system includes an access point AP and at least one STA. The access point 200 includes a processor 210, a wake-up transceiver 220, a main transceiver 230, and a memory 240. The processor 210 controls an operation of the access point 200, and may be configured to process a signal. The memory 240 may include a read-only memory and a random access memory, and provide an instruction and data to the processor 210. Components of the access point 200 are coupled together by using a bus system 250, where the bus system 250 further includes a power bus, a control bus, a status signal bus, in addition to a data bus. However, for clear description, various types of buses in the figure are marked as the bus system 250.

Specifically, the wake-up transceiver 220 is configured to receive a wake-up frame transmitted by a first STA, where the wake-up frame is used to trigger the wake-up transceiver 220 to wake up the main transceiver 230; and the wake-up transceiver 220 is further configured to wake up the main transceiver 230 based on the wake-up frame.

It should be understood that, the access point 200 according to this embodiment of this application may correspond to the access point 20 in the embodiment of this application, and may correspond to a corresponding entity that performs the method according to the embodiment of this application. In addition, the foregoing and other operations and/or functions of each module in the access point 200 are respectively intended to implement a corresponding procedure of the method 100. For brevity, details are not described again herein.

Therefore, the access point according to this embodiment of this application can receive the wake-up frame transmitted by the station, and wake up, by using the WUR, the main transceiver based on the wake-up frame. Therefore, when the station needs to transmit uplink data, an uplink data transmission latency can be reduced.

Alternatively, the wake-up transceiver 220 is configured to receive a wake-up frame transmitted by a second STA, where the wake-up frame is used to trigger the wake-up transceiver 220 to wake up the main transceiver 230; the wake-up transceiver 220 is further configured to wake up the main transceiver 230 based on the wake-up frame; and the main transceiver 230 is configured to receive a data frame transmitted by the second STA.

It should be understood that, the access point 200 according to this embodiment of this application may correspond to the access point 40 in the embodiment of this application, and may correspond to a corresponding entity that performs the method according to the embodiment of this application. In addition, the foregoing and other operations and/or functions of each module in the access point 200 are respectively intended to implement a corresponding procedure of the method 200. For brevity, details are not described again herein.

Therefore, when the access point according to this embodiment of this application is woken up by a wake-up frame transmitted by a station, the access point may receive uplink data transmitted by another station. Therefore, the another station does not need to transmit a wake-up frame to the access point any longer, but directly contends for a channel, and transmits the uplink data on the channel obtained through contention. Therefore, signaling overheads can be reduced, and an uplink data transmission latency can be reduced.

It should be understood that in the embodiment of this application, the processor may be a central processing unit (Central Processing Unit, CPU), or the processor may be another general purpose processor, a digital signal processor (DSP), an application-specific integrated circuit (ASIC), a field programmable gate array (FPGA), or another programmable logic device, a discrete gate or transistor logic device, a discrete hardware component, or the like. The general purpose processor may be a microprocessor, or the processor may be any conventional processor or the like.

The memory may include a read-only memory and a random access memory, and provide an instruction and data to the processor. A part of the memory may further include a non-volatile random access memory. For example, the memory may further store information of a device type.

In an implementation process, steps in the foregoing methods can be implemented by using a hardware integrated logic circuit in the processor, or by using instructions in a form of software. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described again herein.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wake-up method, performed in a communications system, the communications system comprising an access point (AP) and at least one station (STA), the AP comprising a wake-up transceiver (WUR) and a main transceiver, and the method comprising:
    determining, by a first STA, that the AP is in a sleep state, wherein when the AP is in the sleep state, the main transceiver of the AP is in an off state;
    transmitting, by the first STA, a wake-up frame to the WUR of the AP, wherein the wake-up frame triggers the WUR of the AP to wake up the main transceiver of the AP;
    transmitting, by the first STA, a first capability information frame to the main transceiver of the AP, wherein the first capability information frame carries first indication information, and the first indication information indicates whether the first STA has a capability of transmitting the wake-up frame; and
    receiving, by the first STA, a second capability information frame transmitted by the AP using the main transceiver of the AP, wherein the second capability information frame carries second indication information and/or third indication information, the second indication information indicates whether the AP comprises the WUR, and the third indication information indicates whether the AP can be woken up by the first STA.

2. The method according to claim 1, wherein the second capability information frame further carries a wake-up identifier, and the wake-up identifier identifies the WUR of the AP; and
    the transmitting, by the first STA, the wake-up frame to the WUR of the AP comprises:
    transmitting, by the first STA, the wake-up frame to the WUR of the AP based on the wake-up identifier, wherein the wake-up frame carries the wake-up identifier.

3. The method according to claim 1, wherein the method further comprises:
    receiving, by the first STA, a sleep notification frame transmitted by the AP using the main transceiver of the AP, wherein the sleep notification frame carries sleep state indication information, and the sleep state indication information indicates information related to the sleep state; and
    the determining, by a first STA, that the AP is currently in a sleep state comprises:
    determining, by the first STA based on the sleep state indication information, that the AP is currently in the sleep state.

4. The method according to claim 3, wherein the sleep state indication information comprises at least one of the following indication information:
  a fourth indication information that indicates that the AP enters the sleep state after the AP has transmitted the sleep notification frame,
  a fifth indication information that indicates a time at which the AP starts to enter the sleep state,
  a sixth indication information that indicates a duration in which the AP is in the sleep state,
  a seventh indication information that indicates a quantity of sleep notification frames that the first STA further needs to receive in a receive period of the sleep notification frame after the first STA has received the sleep notification frame, or
  an eighth indication information that indicates a work mode of the WUR of the AP in a time period in which the AP is in the sleep state, and wherein the work mode comprises an always-on work mode and a periodically-on work mode.

5. The method according to claim 4, wherein the eighth indication information indicates that the work mode of the WUR of the AP is the periodically-on work mode in the time period in which the AP is in the sleep state, the sleep state indication information further comprises ninth indication information, and the ninth indication information indicates a time period in which the WUR of the AP is in an on state; and
  the transmitting, by the first STA, a wake-up frame to the WUR of the AP comprises:
  transmitting, by the first STA, the wake-up frame to the WUR of the AP in the time period indicated by the ninth indication information.

6. The method according to claim 3, wherein the sleep state indication information further comprises contention window size information, and the contention window size information indicates a size of a contention window; and
  the transmitting, by the first STA, a wake-up frame to the WUR of the AP comprises:
    determining, by the first STA, a transmit time of the wake-up frame based on the size of the contention window in a time period in which the WUR of the AP is in an on state; and
    transmitting, by the first STA, the wake-up frame to the WUR of the AP at the transmit time of the wake-up frame.

7. A station (STA) of a communications system, the communications system comprising an access point (AP) and at least one STA, the at least one STA comprising the STA, the AP comprising a first wake-up transceiver (WUR) and a first main transceiver, and wherein the STA comprises:
  a processor configured to determine that the AP is currently in a sleep state, wherein when the AP is in the sleep state, the first main transceiver of the AP is in an off state;
  a second WUR, coupled with the processor, configured to transmit a wake-up frame to the first WUR of the AP, wherein the wake-up frame triggers the first WUR of the AP to wake up the first main transceiver of the AP; and
  transmit a first capability information frame to the first main transceiver of the AP, wherein the first capability information frame carries first indication information, and the first indication information indicates whether the STA has a capability of transmitting the wake-up frame; and
  receive a second capability information frame transmitted by the AP using the first main transceiver of the AP, wherein the second capability information frame carries second indication information and/or third indication information, the second indication information indicates whether the AP comprises the WUR, and the third indication information indicates whether the AP can be woken up by the STA.

8. The STA according to claim 7, wherein the second capability information frame further carries a wake-up identifier, and the wake-up identifier identifies the first WUR of the AP; and
  the second WUR is configured to transmit the wake-up frame to the first WUR of the AP based on the wake-up identifier, wherein the wake-up frame carries the wake-up identifier.

9. The STA according to claim 7, wherein the second main transceiver is further configured to:
  receive a sleep notification frame transmitted by the AP using the first main transceiver of the AP, wherein the sleep notification frame carries sleep state indication information, and the sleep state indication information indicates information related to the sleep state; and
  the processor is configured to determine, based on the sleep state indication information, that the AP is currently in the sleep state.

10. The STA according to claim 9, wherein the sleep state indication information comprises at least one of the following indication information:
  a fourth indication information that indicates that the AP enters the sleep state after the AP has transmitted the sleep notification frame,
  a fifth indication information that indicates a time at which the AP starts to enter the sleep state,
  a sixth indication information that indicates a duration in which the AP is in the sleep state,
  a seventh indication information that indicates a quantity of sleep notification frames that the STA further needs to receive in a receive period of the sleep notification frame after the STA has received the sleep notification frame, or
  an eighth indication information that indicates a work mode of the first WUR of the AP in a time period in which the AP is in the sleep state, and the work mode comprises an always-on work mode and a periodically-on work mode.

11. The STA according to claim 10, wherein the eighth indication information indicates that the work mode of the first WUR of the AP is the periodically-on work mode in the time period in which the AP is in the sleep state, the sleep state indication information further comprises ninth indication information, and the ninth indication information indicates a time period in which the first WUR of the AP is in an on state; and
  the second WUR is configured to:
  transmit the wake-up frame to the first WUR of the AP in the time period indicated by the ninth indication information.

12. The STA according to claim 9, wherein the sleep state indication information further comprises contention window size information, and the contention window size information indicates a size of a contention window; and
  the second WUR is configured to:
  determine a transmit time of the wake-up frame based on the size of the contention window in a time period in which the first WUR of the AP is in an on state; and transmit the wake-up frame to the first WUR of the AP at the transmit time of the wake-up frame.

13. An access point (AP) of a communications system, wherein the communications system comprises the AP and at least one station (STA), and the AP comprises:
   a processor;
   a wake-up transceiver, coupled with the processor, (WUR) configured to receive a wake-up frame transmitted by a first STA, wherein the wake-up frame triggers the WUR to wake up a main transceiver of the AP, and the WUR is further configured to wake up the main transceiver based on the wake-up frame;
   wherein the main transceiver is configured to:
      receive a first capability information frame transmitted by the first STA, wherein the first capability information frame carries first indication information, and the first indication information indicates whether the first STA has a capability of transmitting the wake-up frame, and
      transmit a second capability information frame to the first STA, wherein the second capability information frame carries second indication information and/or third indication information, the second indication information indicates whether the AP comprises the WUR, and the third indication information indicates whether the AP can be woken up by the first STA, wherein the second capability information frame further carries a wake-up identifier, and the wake-up identifier identifies the WUR of the AP, and wherein the wake-up frame carries the wake-up identifier.

14. The AP according to claim 13, wherein the main transceiver is further configured to:
   transmit a sleep notification frame to the first STA, wherein the sleep notification frame carries sleep state indication information, and the sleep state indication information indicates information related to a sleep state.

15. The AP according to claim 14, wherein the sleep state indication information comprises at least one of the following indication information:
   a fourth indication information that indicates that the AP enters the sleep state after the AP has transmitted the sleep notification frame,
   a fifth indication information that indicates a time at which the AP starts to enter the sleep state,
   a sixth indication information that indicates a duration in which the AP is in the sleep state,
   a seventh indication information that indicates a quantity of sleep notification frames that the first STA further needs to receive in a receive period of the sleep notification frame after the first STA has received the sleep notification frame, or
   an eighth indication information that indicates a work mode of the WUR in a time period in which the AP is in the sleep state, and the work mode comprises an always-on work mode and a periodically-on work mode.

16. The AP according to claim 15, wherein the eighth indication information indicates that the work mode of the WUR is the periodically-on work mode in the time period in which the AP is in the sleep state, the sleep state indication information further comprises ninth indication information, and the ninth indication information indicates a time period in which the WUR is in an on state.

17. The AP according to claim 14, wherein the sleep state indication information further comprises contention window size information, and the contention window size information indicates a size of a contention window, so that the first STA determines a transmit time of the wake-up frame based on the size of the contention window in a time period in which the WUR is in an on state.

* * * * *